(12) United States Patent
Le et al.

(10) Patent No.: US 7,793,279 B1
(45) Date of Patent: Sep. 7, 2010

(54) DYNAMIC DRIVER SUBSTITUTION

(75) Inventors: Bich Cau Le, San Jose, CA (US);
Matthew Eccleston, San Carlos, CA (US)

(73) Assignee: VMware, Inc, Palo Alto, CA (US)

( * ) Notice: Subject to any disclaimer, the term of this patent is extended or adjusted under 35 U.S.C. 154(b) by 1079 days.

(21) Appl. No.: 11/491,852

(22) Filed: Jul. 24, 2006

Related U.S. Application Data

(63) Continuation of application No. 10/197,979, filed on Jul. 17, 2002, now Pat. No. 7,082,598.

(51) Int. Cl.
*G06F 9/44* (2006.01)
*G06F 3/00* (2006.01)

(52) U.S. Cl. .................... 717/168; 719/321
(58) Field of Classification Search ......... 717/168–178; 719/321, 327
See application file for complete search history.

(56) References Cited

U.S. PATENT DOCUMENTS 6,968,307 B1 * 11/2005 Chrysanthakopoulos ..... 703/27

* cited by examiner

*Primary Examiner*—Philip Wang
(74) *Attorney, Agent, or Firm*—Jeff Pearce

(57) ABSTRACT

An agent loaded in a computer's operating system (OS) simulates disconnection and reconnection of a device, with no need to actually disconnect the device logically from a computer. During simulated reconnection, when the OS requests the hardware ID of the device, the agent returns a substitute ID, which causes the OS to load a substitute driver. Substitution of the ID also allows driver substitution for a not yet logically connected device; in this cases, no simulated disconnection or reconnection is needed. Driver substitution is dynamic and reversible, with no need to restart the system or reboot the OS and substitution of a driver for one device of a type does not disturb other devices of the same type. The invention may be implemented entirely in software, with no need for hardware modifications or device customization.

17 Claims, 27 Drawing Sheets

DYNAMIC DRIVER SUBSTITUTION

CROSS-REFERENCE TO RELATED APPLICATIONS

This application is a Continuation of U.S. patent application Ser. No. 10/197,979, filed 17 Jul. 2002 now U.S. Pat. No. 7,082,598.

BACKGROUND OF THE INVENTION

1. Field of the Invention

This invention relates to operating system software, in particular, operating system components called drivers that enable software applications to use devices attached to the computer.

2. Description of Related Art

An operating system (OS) is a collection of programs that provides an interface and a set of abstractions to higher-level programs called applications. The OS enables the applications to access a computer's hardware, such as its processor, memory, and disks, in a uniform and controlled manner. There exists a class of computer hardware components, called devices, which can be added to and removed from a computer.

An OS includes programs called "drivers" that are responsible for handling specific devices attached to the computer. A driver understands the low-level hardware details of a specific device (or a group of similar devices) so that it can communicate with the device(s). These details are generally known only to the device's vendor or manufacturer so that only a vendor can usually supply drivers for devices it sells.

A driver exposes a well-known "application programming interface" (API) to applications, which allows them to use the device without knowing its vendor-specific details. For example, consider two different digital camera devices from manufacturers A and B and assume that these devices require distinct drivers dA and dB from each of their respective vendors. Although each driver communicates with its device using vendor-proprietary commands and/or information, each exposes the same, unified camera API to applications. The API might consist of operations generic to all cameras, such as "Take a picture," "Identify all the pictures available in the camera's memory," and "Download a particular picture."

When a device is added to a computer, the operating system consults a local database sometimes called the "registry" to check whether the device has been detected before and whether a driver was previously associated with that particular device. Usually, a device is identified by a pair of numbers called the hardware ID, which consists of a vendor ID that identifies the vendor or manufacturer, and a product ID that identifies the particular device model manufactured by that vendor. The registry maps hardware IDs to drivers. If no mapping exists for a new device's hardware ID, the operating system asks the user to insert a CD or floppy disk containing the driver supplied by the device's vendor. The operating system then copies the driver file to the computer's local disk, creates a new registry entry mapping the hardware ID to the driver, and loads the driver into memory, allowing it to communicate with the device. In the future, if another device with the same hardware ID is detected, the OS uses the existing mapping to automatically locate the appropriate driver and load it into memory.

Some types of devices, such as PCI cards, can be added and removed only when the computer is powered off. Other devices are "hot-pluggable": they can safely be added and removed while the computer is running. Many hot-pluggable devices follow the Universal Serial Bus (USB) standard. As is well known, the widely available USB specification defines the physical requirements of a USB device and the protocol it uses to communicate with a computer over a USB cable. Multiple USB devices can attach to a computer's USB ports using cables and hubs. USB's ease of use and ubiquity (all modern personal computers support it) make it a standard of choice for consumer devices ranging from keyboards and mice to scanners.

The USB standard defines a limited set of generic commands—known as "transactions"—that a driver uses to communicate with a USB device. Transactions specify operations such as IN and OUT, which are used to send and receive binary data. Although the commands are generic, the meaning of the actual data that is transferred is specific to a device. Although any driver can send transactions to any USB device, only a driver specific to a particular device knows how to set up and interpret the data exchanged with that device and thus control it. To allow applications to use a USB device, a USB driver translates high-level operations sent from applications through the exposed API into lower-level USB transactions, which are then sent to the device through one of the computer's USB connectors, called "ports."

In some situations, it is desirable to dynamically substitute a different driver for a device for which an existing driver has already been loaded. Two cases show how this capability could be exploited.

Case 1

Driver substitution is useful for any device that needs to pretend it is a different device for a limited time for compatibility reasons, and then to change its identity to expose unique features. Assume for example a USB keyboard from a hypothetical manufacturer "Acme," and that the Acme device has a built-in joystick in addition to the generic keyboard functions. Suppose further that the Acme device's hardware ID is (VendorID=Acme, ProductID=KeyboardWithJoystick), or AcmeHardwareID for short, and that Acme supplies a driver named AcmeJoystickKeyboard.sys on a floppy disk. Additionally, assume the OS has the following limitations:

1) At boot time, a keyboard must be attached to the computer.

2) During boot, the OS can load drivers only for known devices, and cannot create registry mappings for new devices until a later phase.

3) The OS only has one driver—called GenericUsbKeyboard.sys—that supports only generic USB keyboards with minimal functionality. This generic keyboard has a hardware ID equal to (VendorID=GenericVendor, ProductID=GenericKeyboard), or GenericKeyboardHardwareID for short.

Consider now the first time the Acme keyboard is attached to a computer, which is initially powered off. After power-on, the OS boots, detects the Acme device and reads its hardware ID. If the device returns its true hardware ID, then the OS would be unable to find a suitable driver and will temporarily ignore the device due to limitation #2. After realizing that no keyboard is attached, the OS will report an error because of limitation #1 and will aborts the boot process. This will make the computer unusable.

In order for the OS to boot correctly, the Acme device instead takes advantage of #3 and pretends it is a generic keyboard by returning GenericKeyboardHardwareID as its hardware ID. During and after the boot process, the device's keyboard functions are available because the GenericUsbKeyboard.sys driver was loaded. This allows a user to type, but the joystick function is not operational because only the Acme driver knows about it.

If a dynamic driver substitution capability existed, however, it could be used to unload the GenericUsbKeyboard.sys driver and replace it with AcmeJoystickKeyboard.sys after the OS finishes booting. Unfortunately, the OS typically does not unload a driver until its device is removed or unplugged from the computer, so achieving the desired driver switch in a way that is transparent to the user is difficult or impossible using known technology.

One known technique that attempts to get around the problem described in this Case 1, in particular for USB keyboards equipped with advanced (non-keyboard) features, involves a so-called "hardware-simulated unplug." According to this technique, the device first impersonates a generic USB keyboard during the boot phase, which allows the generic keyboard driver to load and the user to type. Once the OS is booted, a vendor-supplied application sends a proprietary command (possibly in the form of a special sequence of simulated keystrokes) to the device through the generic keyboard driver. Upon detecting the special command, the device pretends to unplug itself by temporarily powering itself off from the USB bus. This causes the OS to unload the generic keyboard driver. The device then powers itself up again, which causes the OS to detect it and request its hardware ID. This time, the device returns its true hardware ID, which causes the OS to ask the user to supply a disk containing the vendor-specific driver that takes full advantage of all of the device's features.

One disadvantage of this driver substitution mechanism is that the device itself must support it. Another disadvantage is that most devices are simply not designed with the capability of simulating an unplug operation using the self-power-off technique.

Case 2

An application could also use driver substitution to take over control of a device. This would be achieved by replacing the existing driver with the application's own driver, thus allowing the application to access the device in new ways not previously permitted by the old driver. The application could then also gain exclusive access to the device if the new driver exports an API known only to the application. This would prevent other applications from even knowing that the device exists.

A virtual machine monitor (VMM) is one example of an application that could use this capability. A VMM is an application that acts as a supporting interface for a complete virtual computer that is implemented entirely in software. The virtual computer, also known as a "virtual machine" (VM), contains and runs its own OS, called the guest OS. The virtual computer and VMM run as an application on or together with the host OS, which itself runs on the physical computer.

Virtual machine monitors have a long history, dating back to mainframe computer systems in the 1960s. See, for example, Robert P. Goldberg, "Survey of Virtual Machine Research," IEEE Computer, June 1974, p. 54-45. A VMM is usually a relatively thin layer of software that runs directly on top of a host, such as existing system software (including a host OS), or directly on the hardware, and virtualizes the resources of the (or some) hardware platform. The interface exported to the VM is usually such that the guest OS cannot determine the presence of the VMM. The VMM also usually tracks and either forwards (to the host OS) or schedules and handles all requests by the VM for machine resources, as well as various faults and interrupts. The general features of VMMs are known in the art and are therefore not discussed in further detail here.

If the VM exposes virtual USB ports to the guest OS, this feature can be used to allow the guest OS to access a real USB device attached to the physical computer, as long as the guest OS has the appropriate driver. A preferred way to design this feature follows:

The guest OS is assumed to have a driver specific to the particular physical USB device it wishes to access. That driver then sends USB transactions to one of the virtual computer's USB ports. The VMM application detects this activity on the virtual USB port and receives the transactions.

The VMM needs to send those transactions to the physical USB device. Given that drivers can communicate only with devices, the VMM must pass the transactions to a special USB driver called a "generic" or "pass-through" driver. A generic USB driver has no built-in intelligence and is not specific to any device; it simply exposes an API that allows it to receive raw USB transactions from applications. The driver then sends those unmodified transactions directly to the device.

Unfortunately, before the VMM application even starts, the host OS may already have loaded a different driver for the physical USB device. Once the virtual computer is running, the guest OS will therefore not be able to communicate with the device because the generic USB driver will not be loaded, which will prevent the VMM from sending any transactions to it.

Another known method for overcoming some of the disadvantages above involves OS support for driver upgrades in systems in which the OS maintains a registry that maps hardware IDs to drivers. These systems usually provide an API to modify an existing mapping to point to a new driver. This is particularly useful for driver upgrades. For example, the Microsoft Windows function UpdateDriverForPlugAndPlayDevices( ) allows an application to change the driver associated with a specific hardware ID.

The shortcoming of this technique is that it updates the driver for all devices with the affected hardware ID. Suppose for instance that three identical USB cameras named C1, C2, and C3 are attached to the physical computer. In Case 2, if a VMM wishes to connect only C1 to a virtual computer by replacing the camera driver with a generic USB driver, then changing the registry mapping would affect all three cameras because they all have the same hardware ID. Changing the driver for C1 would thus also affect C2 and C3 and cause them to malfunction when accessed by the host OS.

What is needed is therefore some mechanism that overcomes the shortcomings of the prior art mentioned above by making possible a dynamic driver substitution capability for devices, whereby a new driver can be substituted for an existing one, with no need for hardware support or modifications to the existing operating system or to the devices themselves. The mechanism should ideally be able to work even for devices that are required by the OS during the boot-up procedure, as well as for devices that are not yet even connected. Where the system includes more than one device of a given type, the mechanism should furthermore allow driver substitution for individual devices of the type, without affecting the operation of the other devices of the same type. Various aspects of this invention meet some or all of these needs.

SUMMARY OF THE INVENTION

The invention provides a system and method for controlling access to a device in a computer system, which includes an operating system (OS) and in which access to the device takes place through a driver. The invention dynamically changes the current driver for the device while the computer system is continuously powered on and the OS is continuously operational.

The device is identified by a first identifier, which the OS associates with the current driver for the device. The step of dynamically changing the current driver for the device comprises passing to the OS a different, substitute identifier associated with a substitute driver, which causes the OS to make the substitute driver the current driver for the device.

Different aspects of the invention can handle both the case in which the device is already connected to the computer and the case in which the device is not yet, but is being connected. For the case in which the device is already connected to the computer system, the step of dynamically changing the current driver for the device includes simulating disconnection of the device, followed by simulating reconnection of the device.

The invention is preferably installed in a system in which the OS maintains a map of device identifiers to respective corresponding drivers. Upon detection or notification of connection of an added device, the OS requests the identifier for the added device and associates with the added device the driver corresponding to the identifier for the added device; this driver thus becomes the current driver for the added device. Upon detection or notification of disconnection of any connected device, however, the OS disassociates the current driver from the disconnected device. The step of simulating disconnection of the device comprises maintaining logical connection of the device to the computer system while notifying the OS of disconnection of the device. The step of simulating reconnection of the device then includes both the step of notifying the OS of connection of the device as if it were an added device and also the step of passing to the OS the substitute identifier.

The step of simulating reconnection of the device further includes monitoring responses to the OS request for the identifier for the added device and intercepting the response that contains the first identifier. Instead of the "normal" response, the invention substitutes a response that contains the substitute identifier.

The invention may be used to dynamically substitute the driver for a device that is a group of devices, where each device is connected to a respective port. In this case, in response to a scan request, a parent sub-system of the group scans the ports to determine the connection status of the respective device and returns connection status information indicating the connection status of each device in the group. The OS, which maintains a list of connected devices, detects device disconnection by comparing the list with the connection status information returned by the parent sub-system. The step of simulating disconnection of the device then preferably includes a) causing the OS to issue a scan request to the parent sub-system; and b) monitoring the parent sub-system for its response to the scan request and, for the device whose driver is to be substituted, changing, in the returned connection status information, the corresponding connection status to indicate disconnection. The step of simulating reconnection of the device includes a) causing the OS to issue another scan request to the parent sub-system; and b) monitoring the parent sub-system for its response to the scan request and allowing the returned connection status information to pass the OS unchanged.

In the case where all the devices in the group share a common identifier and therefore default driver, simulating disconnection and reconnection, and dynamically changing the current driver, may be carried out only for the current device. The remaining devices in the group may continue to share the common driver.

The invention is preferably implemented as an agent installed as a driver within the OS.

The invention also works in a system that includes a virtual machine (VM), which in turn include a virtual device. In such a configuration, a virtual machine monitor (VMM) is preferably installed as an interface between the VM and a hardware platform of the computer system. The VMM the converts access requests issued from within the VM to the virtual device into access requests for the physical device and passes the access requests for the physical device to the OS. The agent according to the invention then dynamically changes the driver for the physical device.

As mentioned above, the invention may also be used to dynamically change the current driver for the device before the device is logically connected to and accessible on the computer system. In an auto-acquire mode, the agent performs driver substitution for whatever device is added to the system. In a manual-acquire mode, the agent waits to detect the OS request for the identifier of the added device; the agent then intercepts the response by the parent sub-system to the OS request and, instead of the "normal" first identifier, it passes the substitute identifier to the OS. This causes the OS to load the substitute driver as the current driver.

DETAILED DESCRIPTION

In broadest terms, the invention provides a mechanism for dynamic substitution of a driver according to which the hardware ID of the device is "faked" in such a way that the operating system (OS) loads the desired new driver in place of the one it normally would load. This allows for "immediate" ID replacement and driver substitution for devices that are not yet connected to the computer. For devices that are already connected to the computer, however, driver substitution is preceded by first simulating a disconnection of the device, followed by simulating a reconnection.

Overview

The details of a preferred embodiment of the invention are given below. The complexity of that discussion is such, however, that a less detailed, more general overview of the invention is given here, with reference to FIGS. 9 and 18.

Figure 9:
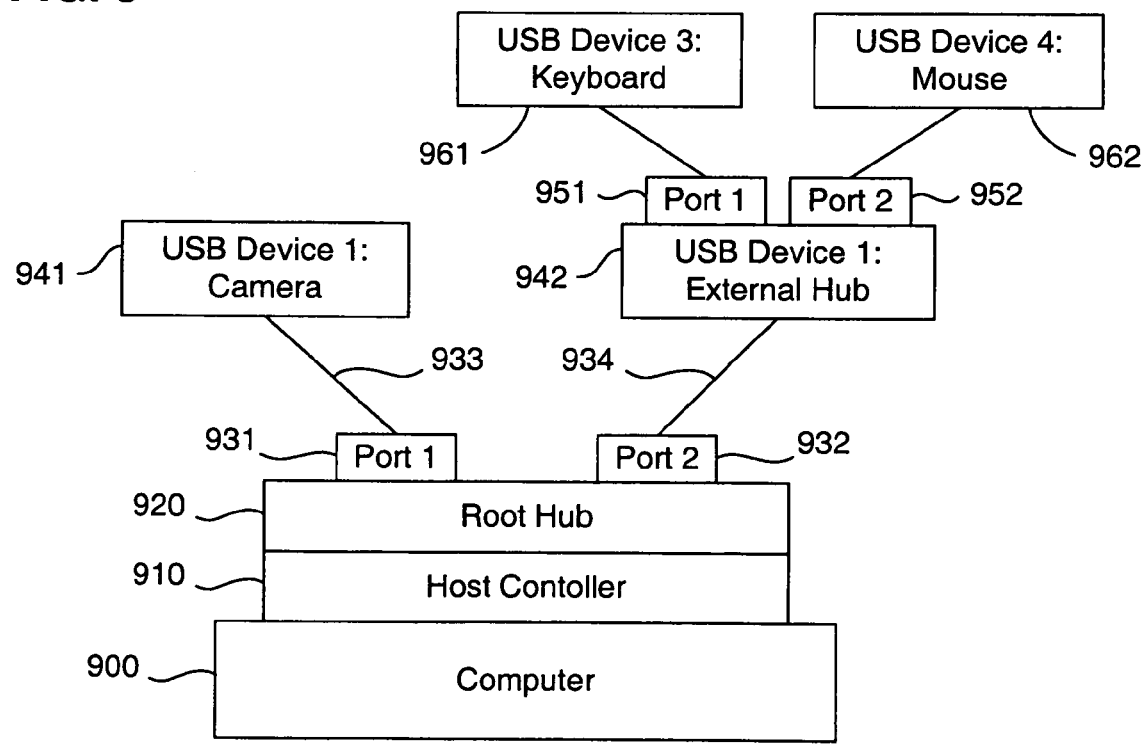
FIG. 9 illustrates an example of the physical topology of USB devices attached to a computer.

FIG. 9 illustrates a typical way in which devices are physically and logically arranged in a computer system. In FIG. 9, three devices are shown attached to a computer 900—a camera 941, a keyboard 961 and a mouse 962. In this example, all these devices are of a common bus "type" or bus "class," namely, USB. In the following description of the invention, that two devices are of the same type means that they are of the same bus type and have the same unique hardware ID, which usually comprises a manufacturer identifier and a device model identifier. The devices are connected to a common controller 910, typically via some form of hub 920. A hub forms a "parent" device for all the "child" devices connected to it, which may include other hubs. Physical connection is via ports (sometimes called "slots").

In general, a separate port is required for each connected device, although components such as external hubs may be used to allow multiple devices to share a port. For example, all USB devices must connect to a port, although an external hub may be used to provide more ports by duplicating the primary ports (of the root hub), similar to a power strip. Thus, in FIG. 9, the camera 941 is connected to a port (Port 1) 931, whereas the keyboard 961 and mouse 962 are connected to another port (Port 2) 932 by way of an intermediate, external hub 942, which in turn provides individual ports 951 and 952 for the keyboard and mouse. Using well known procedures, the controller 910 (or hub 920) can determine that devices are connected by scanning its various ports.

Figure 18:
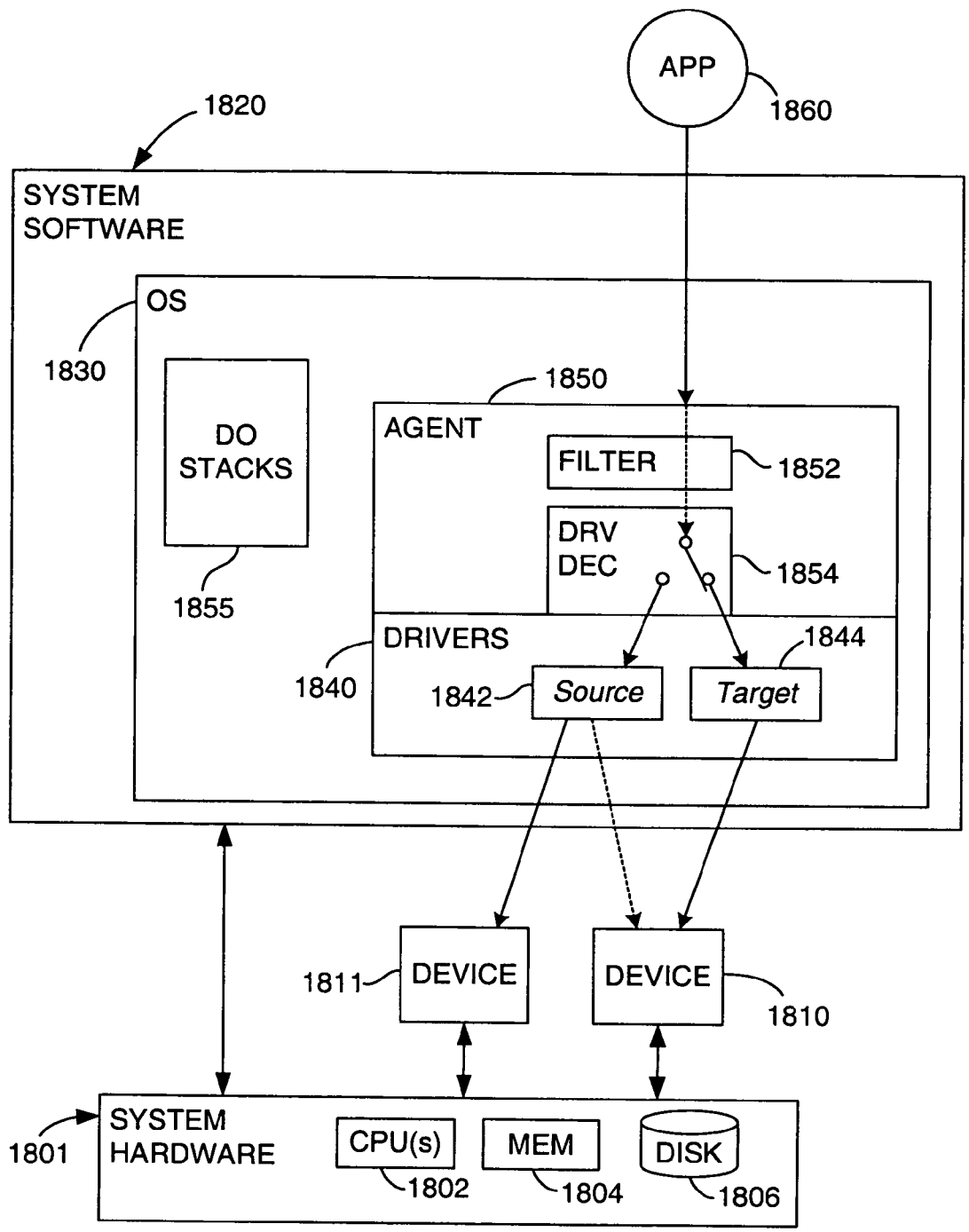
FIG. 18 illustrates the general system configuration of a computer that includes the invention.

FIG. 18 shows the general system configuration of the invention. This configuration is described in detail below. As this figure shows, a key component of the system according to the invention is a software module, referred to here as an "agent" 1850 which is preferably installed within the existing operating system (OS) 1830 of the computer. Device 1810 is connected to system hardware 1801, which is assumed to include an appropriate port. An application 1860 gains access to the device by way of a device driver. It is assumed here that the "normal" or at least current driver for the device is the driver 1842 (Source). Using the invention, however, the agent is able to switch control from the Source driver to a different driver 1844 (Target), or vice versa. In the following discussion, it is assumed for the sake of simplicity that there is only one alternative driver. This is not necessary according to the invention. Rather, as long as the desired driver is properly identified, the agent may be configured to implement a switch between any number of drivers, for example, in a system designed to test different drivers.

As used here, the term "connected," when referring to a device, means not only that it is physically "plugged into" a port, but also that there is power in its cable or other contact arrangement such that, if the status of the port is queried, the response will be TRUE or CONNECTED or something equivalent. Connection is therefore a logical state, which also depends on a physical state.

In the preferred embodiment of the invention, the agent may operate in either a "manual-acquire" mode, or an "auto-acquire" mode. It is not necessary to implement both operating modes; this will depend on whether the system is needed to substitute drivers for already connected devices (manual-acquire mode) or for those not yet connected (auto-acquire mode). Moreover, in the auto-acquire mode, it is still possible to substitute the driver for an already connected device by issuing an ACQUIRE request (see below) to the agent. The auto-acquire mode can therefore be viewed as a superset of the manual-acquire mode: in addition to accepting ACQUIRE requests to substitute the driver for already connected devices (manual-acquire), the agent will also "grab" newly connected, incoming devices (auto-acquire).

The manual-acquire mode is used to substitute or switch the driver for a device that is already connected to the system. (Recall also that manual acquisition can still be carried out when the agent is in the auto-acquire mode.) The process of driver substitution in this case involves simulating (in software) disconnection of the device, then simulating reconnection of the device, during which a substitute ID for the device is passed to the OS. The OS then loads a substitute driver, to which the substitute ID is mapped in the OS ID-to-driver registry.

Assume now that some program, such as an application, wishes to switch the driver for the device. In most cases, the requesting program will be the one that actually wants to communicate with the device, but it may also be some "third party" supervisory program acting with or without the affected program being made aware of the driver substitution. For the sake of simplicity, assume that the same program that requests the driver switch also is the one that will be accessing the device.

The requesting program communicates the request to the agent via any application program interface (API), which may be designed using well known methods. The agent, using known instructions, then asks the parent of the device to scan all of its ports. Port scanning involves the parent device calling through the OS, again using known instructions, to its various ports and querying the connection status of each port. The agent monitors this scanning process, and when it observes the query being sent to a port of interest (by checking the port number indicated in the request), it changes or replaces the reply so as to indicate a connection status of FALSE, that is, "disconnected." In short, the agent "lies" about the actual connection status.

Using existing, standard routines, the OS will notice that the previously connected device is no longer connected, and will execute a "clean up" procedure that removes the device logically from the computer. This clean-up will typically include removing all data structures associated with the device, changing various pointers so that they no longer point to the removed structures, notifying applications that previously pointed to the device, etc. From the point of view of the OS, the device is then no longer present in the system.

The process of simulating reconnection is similar: The agent causes the ports to be scanned, but in this case it does not interfere with the connection status response of the port of interest; rather, the agent allows the port to return connection status TRUE. The OS then proceeds just as if a new device had been plugged into the port—before, its connection status was FALSE, now it is TRUE. One part of the procedure the OS follows when creating the data structures that represent a new device is that it requests the ID of the device.

According to the invention, during the simulated connection phase, the agent monitors all requests issued by the OS for hardware IDs, or for the hardware IDs for only a particular bus type (such as USB or Firewire). When it detects a request for the hardware ID of the "newly connected" device of interest, the agent passes to the OS a substitute hardware ID instead of the "real" one. The OS then consults its registry as usual and loads the driver associated with the substitute ID. Access to the device will then take place via the substitute driver.

The agent thus "tricks" the OS in different ways during the disconnection and (re)connection operations: During the disconnection operation, the agent "fakes" the connection status of the port of interest. During the (re)connection phase, the agent "fakes" the hardware ID of the device. Note that this procedure allows the driver to be substituted with no need to modify the OS itself, and can be implemented entirely in software, that is, as a program of computer instructions that can be loaded into memory just like any other software component.

The auto-acquire mode is used to substitute or switch the driver for a device that is not yet connected to the system, but is in the process of being connected. When in the auto-connect mode, the agent may be set to operate either selectively or non-selectively; in neither case, however, does the agent need to simulate disconnection or reconnection. For selective auto-acquisition, the agent monitors requests issued by the OS for hardware IDs. As in the manual-acquire mode, when the agent detects a request for the hardware ID of the "newly connected" device of interest, the agent passes to the OS a substitute hardware ID instead of the "real" one. For non-selective acquisition, the agent automatically substitutes a driver for whatever device is newly connected, regardless of its hardware ID. The OS then consults its registry as usual and loads the driver associated with the substitute ID. Access to the device will then take place via the substitute driver.

The auto-acquire mode is therefore substantially the same as the manual-acquire mode with the exception that there is no need to simulate disconnection or reconnection. When the agent is not involved in manual acquisition and the auto-acquire mode if "off," the agent remains idle.

Example

USB Devices in the Microsoft Windows Environment

The most commonly anticipated use of the invention is for USB devices that are to work with computers running an operating system in the Microsoft Windows family. It is, moreover, for USB devices in the Windows OS environment that a working prototype of the invention has been successfully developed. The invention is therefore described below primarily in this context. The invention is not restricted, however, to any particular class of devices such as USB or to any particular OS environment. Those skilled in the art of hardware/software interfaces will be able to adapt the invention as described below for use with different device classes and operating systems.

For understanding the description below of the preferred embodiment of the invention, it is useful to keep in mind certain features of the so-called "Windows Driver Model" and the USB architecture. What follows first is therefore a review of these concepts and features.

Windows Driver Model

The Windows Driver Model (WDM) is a specification that defines how an OS (in particular, an OS in the Microsoft Windows family) represents and manages devices. Each type of device is characterized by a hardware ID that includes a vendor ID and a product ID specific to that vendor. A database known as the "registry" is included and maps every known hardware ID to a specific driver. A driver is in turn a program that knows about a particular device type and can control it.

Device Hierarchy

WDM uses a parent-child hierarchy to represent devices attached to a computer. A device is a "bus device" if it owns slots or ports on which other devices can attach. The attached devices are the bus device's "children." For example, a PCI controller is a bus device because it controls a set of PCI slots, each of which can accept a PCI device. A bus device can itself be the child of another bus device. For instance, a PCMCIA controller is a bus device because it controls two or more PCMCIA slots that can accept PCMCIA devices; however, it itself is a PCI device, so it is the child of a PCI controller.

Memory Representation

A WDM OS uses a stack of "device objects" (DOs) to represent each detected device. The stack for a device generally consists of two DOs. The device's driver owns the topmost DO, which is called the "functional device object" (FDO). The driver itself is called the "functional driver" for the stack. The driver for the parent bus device owns the bottom-most DO, which is called the "physical device object" (PDO); the corresponding driver is called the "bus driver" for the stack.

A bus device's driver acts as both the functional driver for the device's FDO and the bus driver for the PDO of each child device. If a bus device has no parent, its PDO belongs to a special bus driver called "root enumerator," which is supplied by the OS.

Figure 1:
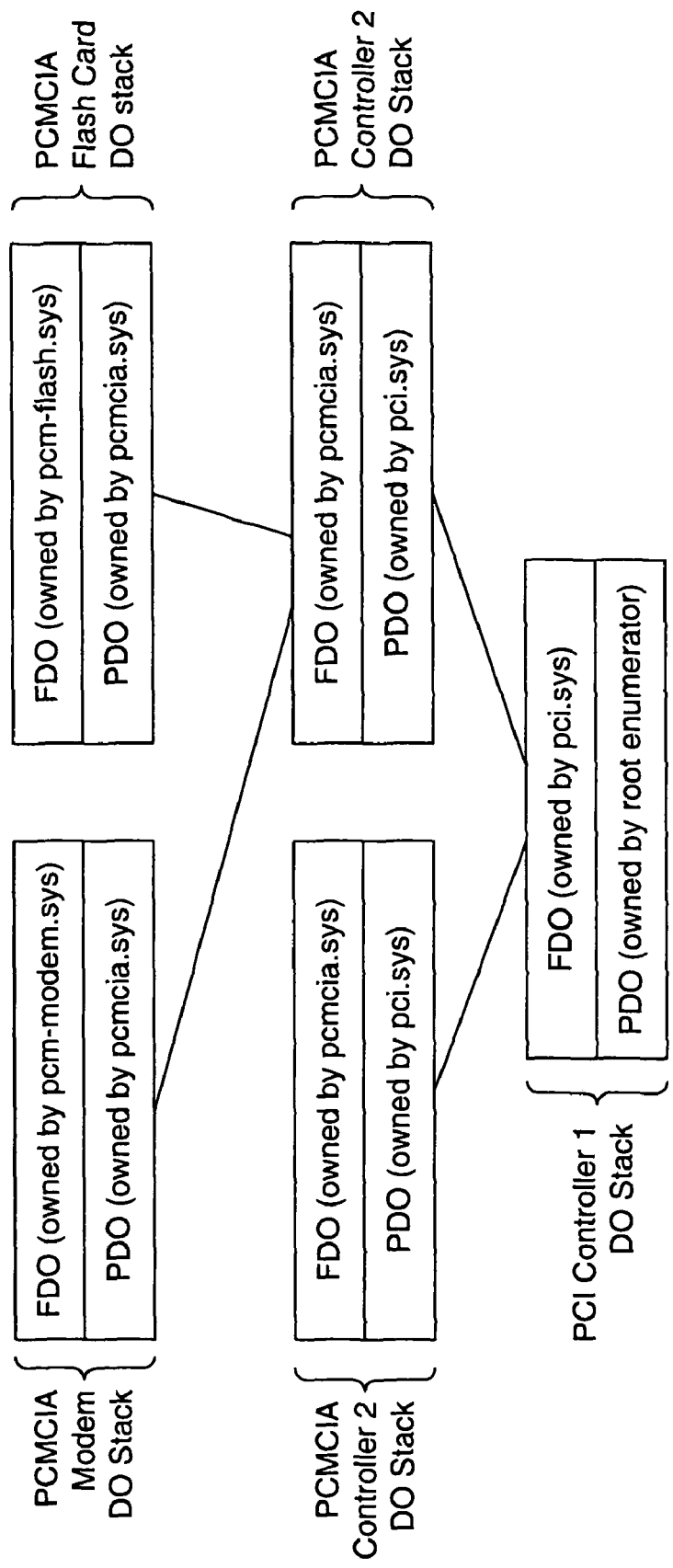
FIG. 1 illustrates a device tree and stacks of device objects (DOs).

These concepts are illustrated in FIG. 1, which shows a DO stack hierarchy for a computer with one PCI controller and two PCMCIA controllers, one of which has two devices attached. As FIG. 1 shows, the FDO of the PCI controller belongs to the PCI driver (pci.sys), that is, the device's functional driver. The controller has no parent, so its PDO belongs to the root enumerator. The PCI controller controls multiple slots, two of which are occupied by identical PCMCIA controllers (controller 1 and controller 2). Each PCMCIA controller's PDO belongs to pci.sys, since the PCI controller is the parent. The FDO belongs to pcmcia.sys, the functional driver for PCMCIA controllers.

Finally, the second PCMCIA controller has two PCMCIA cards attached to it: a modem with driver pcm-modem.sys, and a flash memory card reader with driver pcm-flash.sys. The PDO of each of these devices belongs to pcmcia.sys, while the FDO is controlled by the respective device-specific functional driver.

Driver Extensions

A DO has two parts: an OS-specific section used by the OS to register and manage the DO in a device-independent way, and a driver-specific portion called "driver extension," which the driver usually uses to store information that helps it manage a particular device. Most drivers also store a flag in the driver extension, allowing them to distinguish between a PDO and a FDO, since a driver may own both types of DOs.

I/O Request Packets

When an application wishes to send a request to a device, it uses a procedure call defined by the API exposed by the device's functional driver. The OS intercepts the request, translates it to a data structure called I/O Request Packet (IRP) and sends it to the top-most DO of the device's stack. IRPs may also be internally created and sent by the OS or drivers themselves to communicate with other drivers.

An IRP is a message including at least the following information: 1) a numerical value, called the "major code," which identifies the general class of operation to perform; 2) other numerical parameters, such as the "minor code," which provide more precise detail on the requested operation; and 3) an optional memory buffer supplying the data to be read or written by the operation.

IRP Launch

Figure 2:
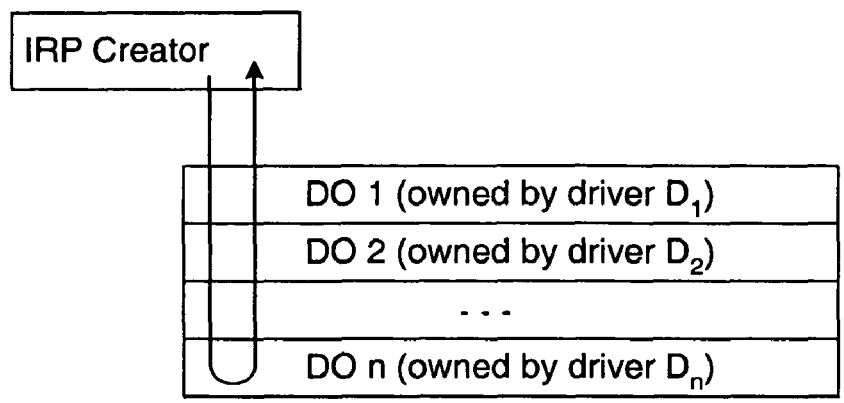
FIGS. 2 and 3 illustrate, respectively, the launch and completion phases of an I/O Request Packet (IRP).

The life cycle of an IRP begins with the "launch" phase. In Windows-based systems, the IRP's creator uses an OS API named IoCallDriver( ) to send the IRP to a particular DO. The OS determines the driver that owns the DO, and then locates the particular driver procedure (called the "dispatch function") responsible for handling the IRP's major code. FIG. 2 shows the path an IRP takes during launch. Each driver has an array of pointers to procedures called a "dispatch table." The major code is used as an offset into the table. The OS fetches the pointer at the specified offset, then calls the dispatch function referenced by that pointer.

A dispatch function is always called with at least two parameters, namely, a pointer to the IRP being sent and a pointer to the DO the IRP is being sent to. Given that the same driver may be responsible for multiple DOs from different stacks, the DO pointer is essential because it allows the driver to precisely identify which stack the IRP is sent to and thus decide how to handle the IRP.

It is common for a dispatch function to send the IRP to the next lower DO in its stack, or even a DO from a different stack, using IoCallDriver( ). During the launch phase, the same IRP can therefore traverse multiple layers of DOs in the same stack or even different stacks, which results in the invocation of a chain of dispatch functions potentially belonging to different drivers.

The last dispatch function to receive the IRP generally places it in a queue, and returns a status of STATUS_PENDING to the caller, indicating that the IRP has been accepted and is being processed. The caller then returns that status to its caller, and so on, until the IRP's creator receives the STATUS_PENDING. This concludes the launch phase.

The example shown in FIG. 2 illustrates an IRP sent to a stack of n device objects, each belonging to a different driver. The drivers are invoked in the order $D_1, D_2, \ldots, D_n$. The dispatch function from driver $D_n$ returns STATUS_PENDING, thereby ending the launch phase.

IRP Completion

The driver that returned STATUS_PENDING during the launch phase owns (that is, is responsible for) the IRP while the specified operation is being carried out. When the operation finishes, the driver initiates a "completion" phase for the IRP by calling the OS API IoCompleteRequest( ). This procedure takes two arguments: a pointer to the IRP being completed, and a status indicator indicating whether the operation succeeded or failed. IoCompleteRequest( ) calls a "completion function" for the driver that owns the DO above the current DO. A completion function takes the same arguments as IoCompleteRequest( ), that is, an IRP pointer and a status indicator. The upper driver's completion function allows it to perform any work it deems necessary when an IRP completes.

The completion function then calls IoCompleteRequest( ) again, which causes the OS to invoke the completion function for the driver owning the next upper DO. This processes repeats until the IRP creator's completion function is invoked. The action the IRP creator performs depends on the operation's status. If, for example, the IRP was originally created in response to an API call from an application, the IRP creator may transfer the operation's results to the application. Finally, the IRP creator destroys the IRP. This ends the IRP life cycle.

Figure 3:
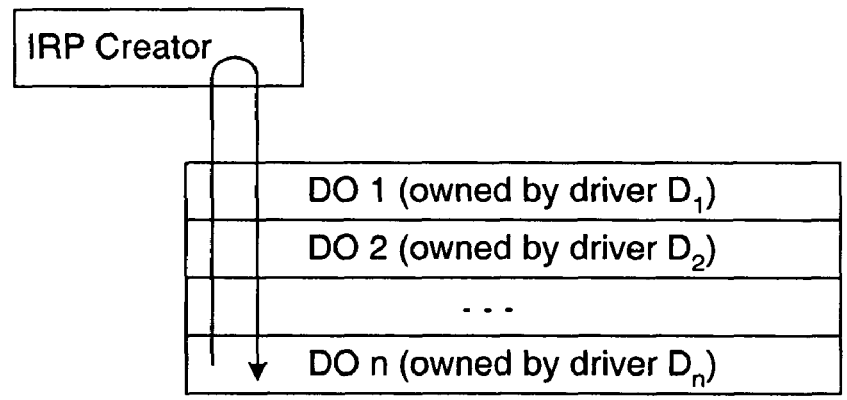

Once the IRP is destroyed, the IRP creator's completion function returns to its caller, which then returns to its caller, and so on, until the driver for the lowest-level DO regains control following the call to IoCompleteRequest( ). FIG. 3 shows the order in which drivers are invoked during the completion phase of the IRP launched in FIG. 2. Note that the IRP creator's completion routine is invoked last, even though the creator itself may not be a driver.

IRP Stack Locations

In order to determine the correct completion function to call when IoCompleteRequest( ) is invoked, the OS uses a data structure embedded in every IRP known as the "IRP location stack." Each element of this stack is called an IRP_STACK_LOCATION (ISL) and contains the following fields:

A device object pointer.
A major code.
A minor code.
A completion function.
A "context pointer" for the completion function.

An IRP contains two markers—the "current marker" and the "next marker"—which indicates the current and next ISL, respectively. ISLs are initialized during the launch phase. When an IRP is first created, the current marker is undefined and the next marker points to the first ISL of the IRP location stack. Before calling IoCallDriver(IRP, DO) to send the IRP to a DO, the IRP creator first sets up the next ISL's major and minor codes to specify the desired operation. More importantly, it sets the next ISL's completion function field to point to its own completion function. It also specifies a "context pointer" to pass to the completion function. The context may point to any arbitrary data that is useful to the completion function.

IoCallDriver( ) advances the two markers, so that "current" becomes "next," and "next" points to the following lower ISL. After advancing the markers, IoCallDriver( ) uses the DO argument to determine the correct driver to receive the IRP, sets the current ISL's device object pointer to the current DO, and then uses the major code from the new current ISL to determine which driver dispatch function to call. The dispatch function then examines the current ISL's minor code to determine the particular operation to be performed. If it decides to send the IRP to the next lower DO, it sets up the next ISL and then calls IoCallDriver( ).

The fact that the major and minor codes can be specified for individual ISLs allows drivers to modify the operation to be performed as the IRP is sent through layers of DOs. This is useful for some types of IRPs, but the common case is for the codes to remain constant, with each dispatch function simply copying the codes from the current ISL to the next.

Figure 4:
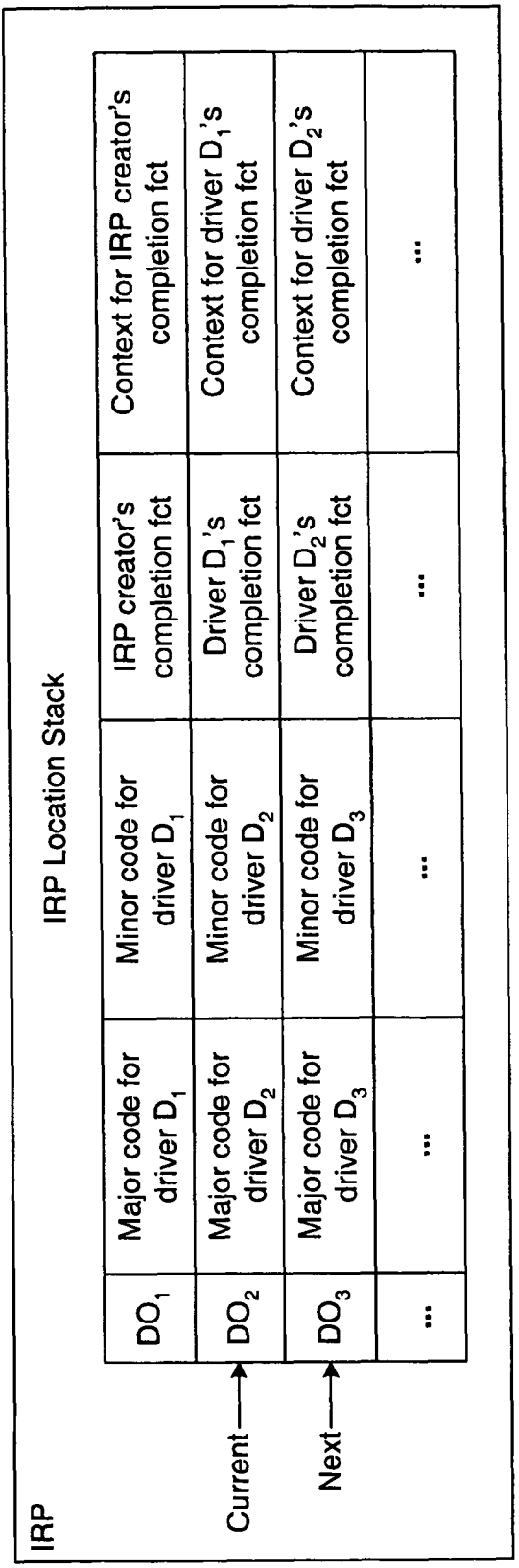
FIG. 4 illustrates IRP stack locations.

FIG. 4 shows the IRP location stack for an IRP that is currently being processed by driver $D_2$. In this example, $D_2$ intends to send the IRP to the next lower device object $DO_3$ belonging to driver $D_3$, so it sets up the next ISL with the desired major and minor codes for $D_3$, and its completion function.

ISLs play a critical role during the completion phase. When the last driver to receive the IRP initiates the completion phase by calling IoCompleteRequest( ), the OS invokes the completion function specified by the current ISL. Just before calling the function, the OS also retreats the two ISL markers, so that when the completion function runs, the current marker will point to the ISL belonging to that driver. The process repeats until the first driver of the DO stack calls the completion function specified by its ISL, which belongs to the IRP creator.

Device Object Stack Creation

WDM defines a process that specifies how drivers collaborate with the OS on the creation, initialization, and ultimately destruction of device objects and device stacks. The OS uses a special type of IRP called Plug-and-Play (PnP) IRP to communicate with drivers during device object initialization and destruction. A PnP IRP's major code is IRP_MJ_PNP, and its minor code specifies the specific PnP operation to perform.

Figure 5A:
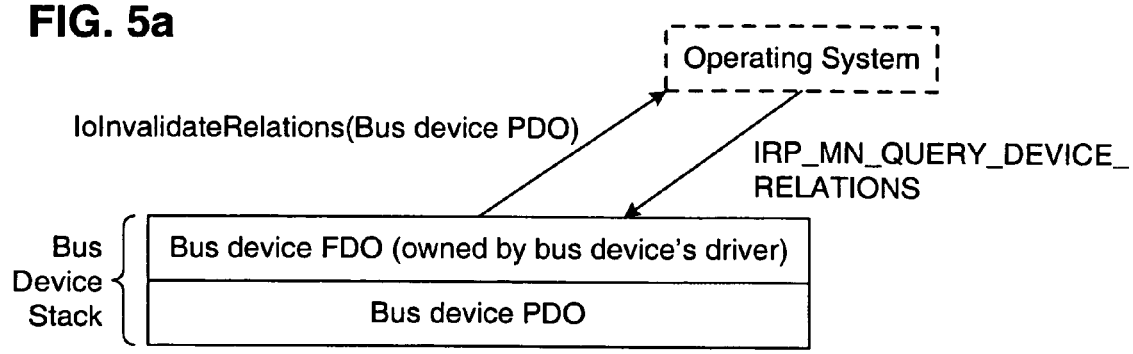
FIGS. 5a-5f illustrate the different steps involved in creating a device stack.
Figure 5B:
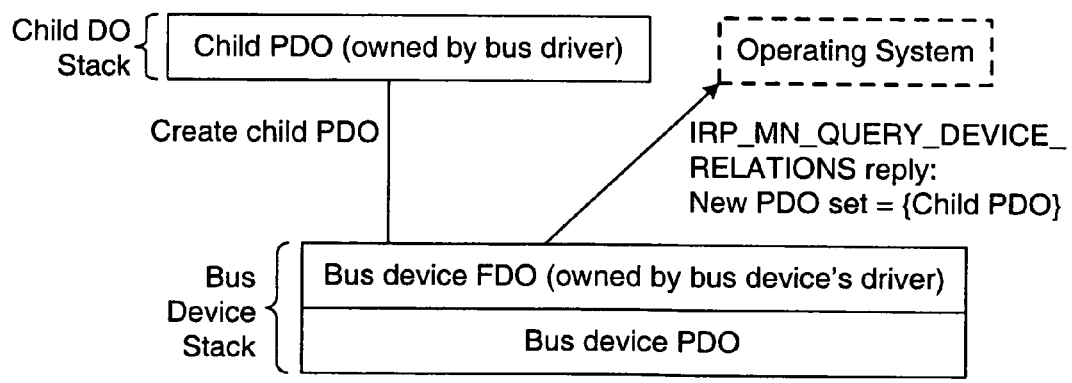
Figure 5C:
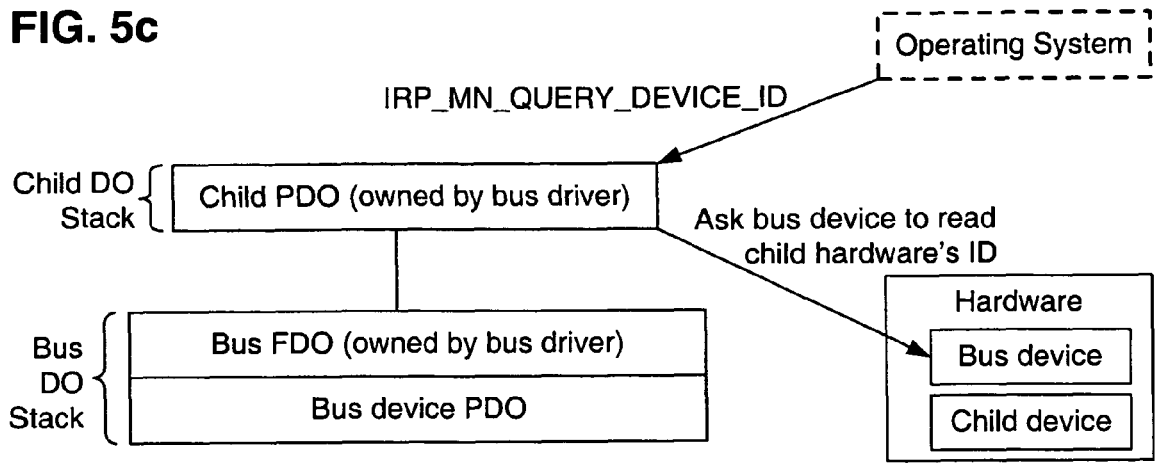
Figure 5D:
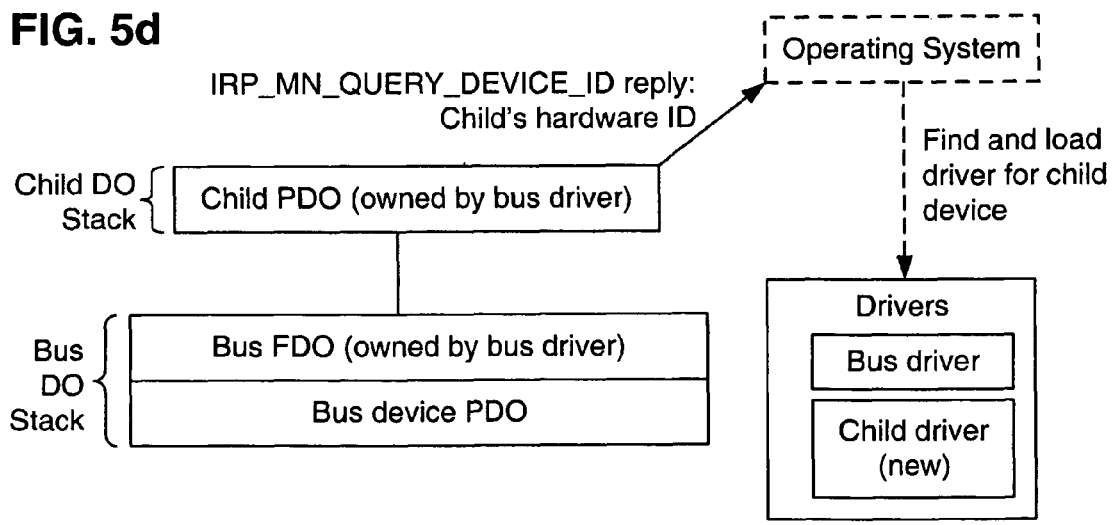
Figure 5E:
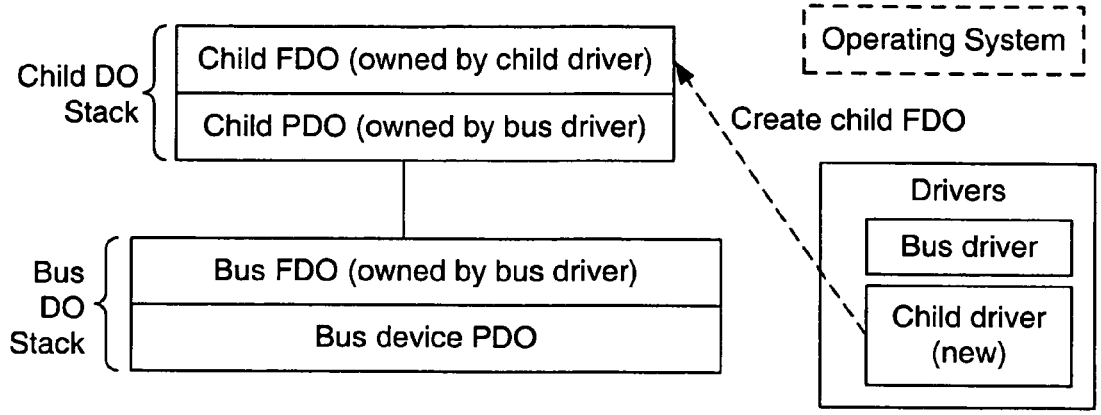
Figure 5F:
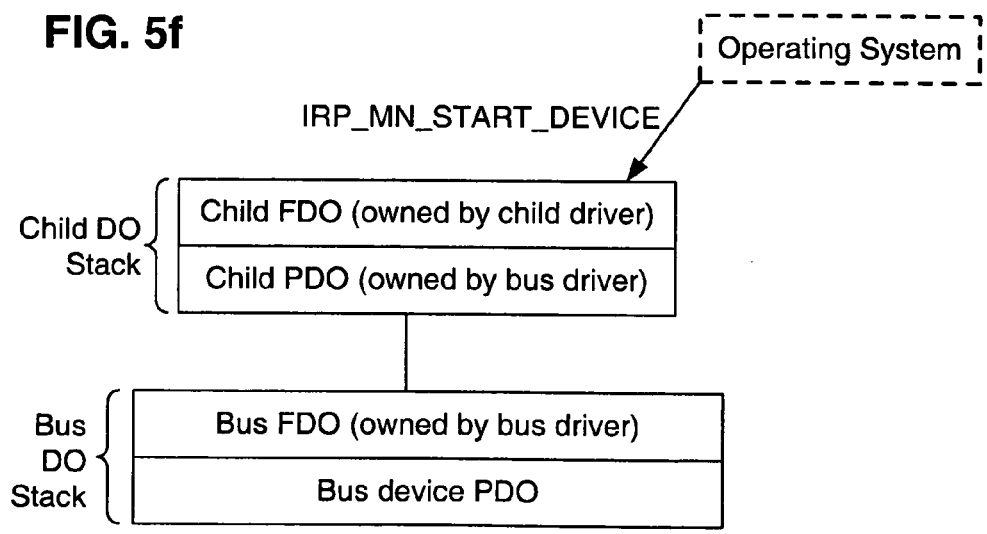

A bus device's driver is responsible for enumerating its children and making their existence known to the OS. When a new child is detected, the driver and the OS communicate using IRPs and API calls to coordinate the creation of a DO stack for the new device. The process of stack creation can be described as the following ten-step procedure. FIG. 5a illustrates steps 1 and 2; FIG. 5b illustrates steps 3 and 4; FIG. 5c illustrates steps 5 and 6; FIG. 5d illustrates steps 7 and 8; and FIGS. 5e and 5f illustrate steps 9 and 10, respectively.

1) Whenever a bus device detects a change in the set of attached devices (that is, the attachment or removal of a child), its driver notifies the OS by calling the IoInvalidateDeviceRelations( ) API procedure. This procedure takes one argument: the PDO of the bus device's stack. This argument allows the OS to identify the bus device that is experiencing a change.

2) The OS sends a PnP IRP with minor code IRP_MN_QUERY_DEVICE_RELATIONS to the top-most DO (usually the FDO) of the bus device's stack. The purpose of this IRP is to get the bus device's current set of children, expressed as a list of PDOs.

3) The bus device driver owns the FDO of its stack and it therefore processes the request. It checks the status of each of its slots or ports and determines which ones are occupied by a child device. If a device not previously seen is detected, then the driver creates a PDO for the new device and adds it to its list of child PDOs. This PDO is the first DO of the new stack.

4) The driver returns the current list of child PDOs to the OS by completing the IRP.

5) The OS keeps a copy of the list of child PDOs of each bus device. Upon receiving the results of IRP_MN_QUERY_DEVICE_RELATIONS, it checks if a new child PDO has been added by comparing the new list with the old one. If a PDO has been added, the OS sends a PnP IRP with minor code IRP_MN_QUERY_ID to the new PDO. The purpose of this IRP is to determine the child device's hardware ID.

6) Because the bus device driver owns the child's PDO, it receives the IRP. It communicates with its bus controller device to read the new child's hardware ID.

7) The bus driver returns the hardware ID to the OS by completing the IRP_MN_QUERY_ID IRP.

8) The OS looks for a driver associated with the hardware ID in the registry.

9) Assuming that a driver is found, the OS loads it into memory. The new driver creates a FDO for the child device and stacks it on top of the PDO created by the bus driver. The child's DO stack is now complete.

10) The OS sends a PnP IRP with minor code IRP_MN_START_DEVICE to the top of the new child device's stack. The child driver owns the stack's FDO and therefore handles this IRP. It initializes the child device, then creates an API allowing applications to start accessing the device.

Device Object Stack Destruction

Figure 6A:
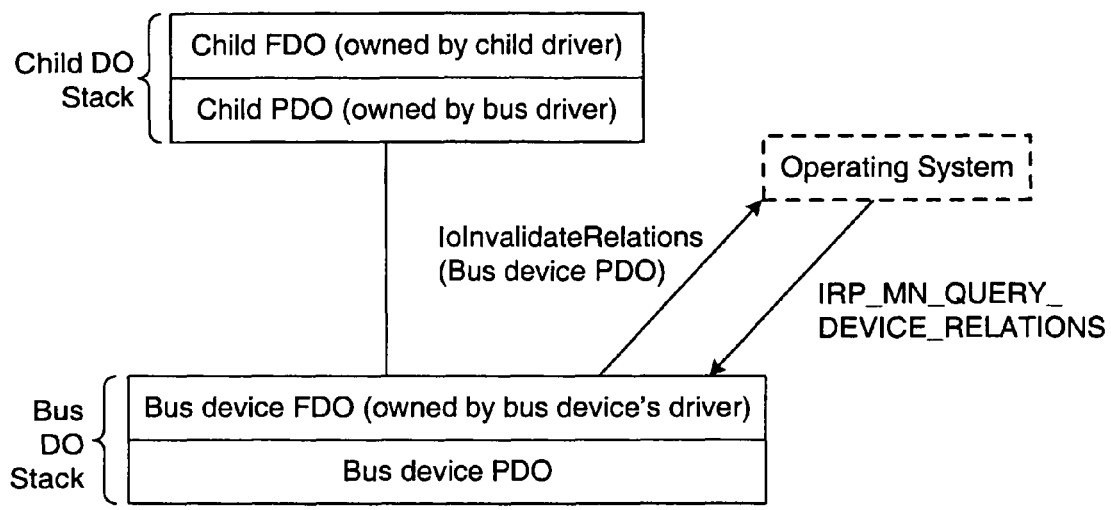
FIGS. 6a-6d illustrate the different steps involved in destroying a device stack.
Figure 6B:
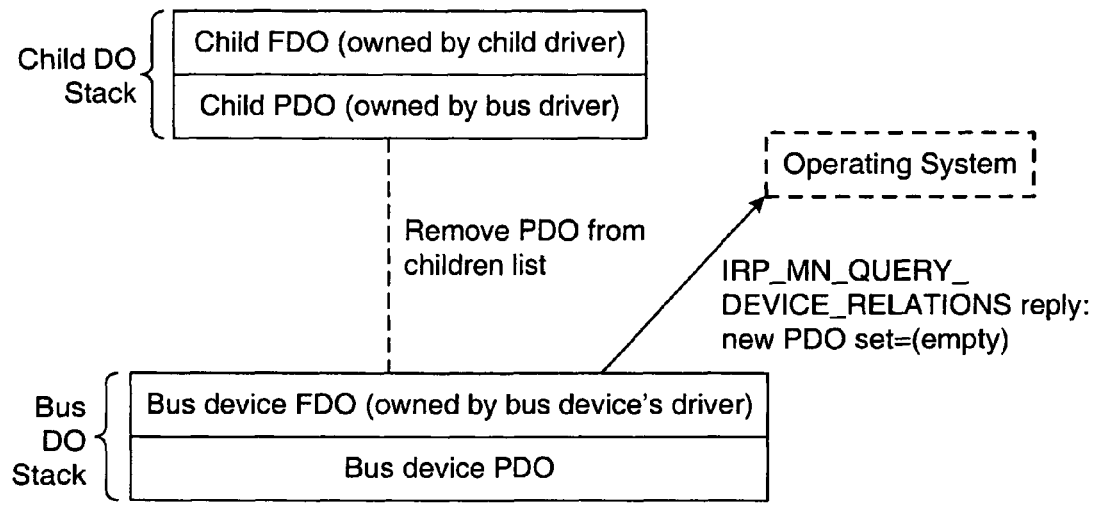
Figure 6C:
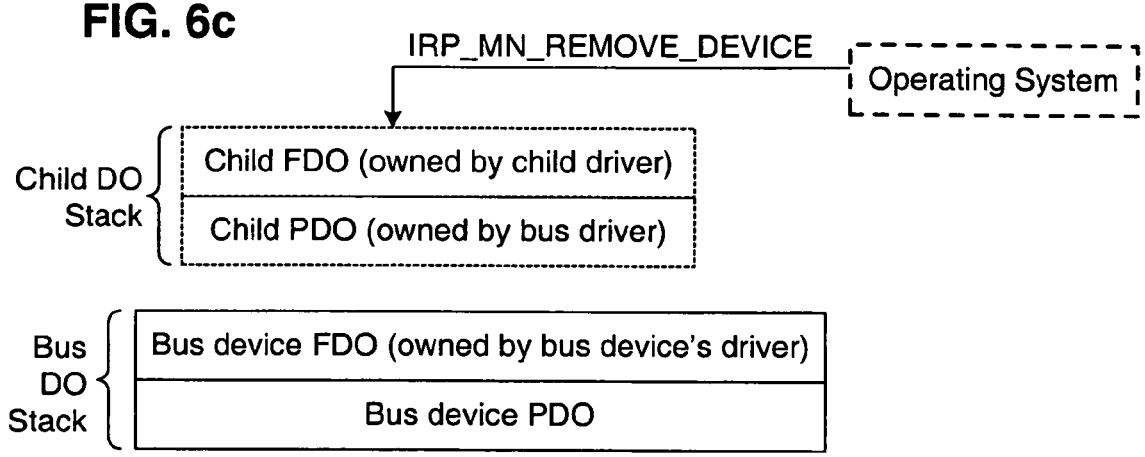
Figure 6D:
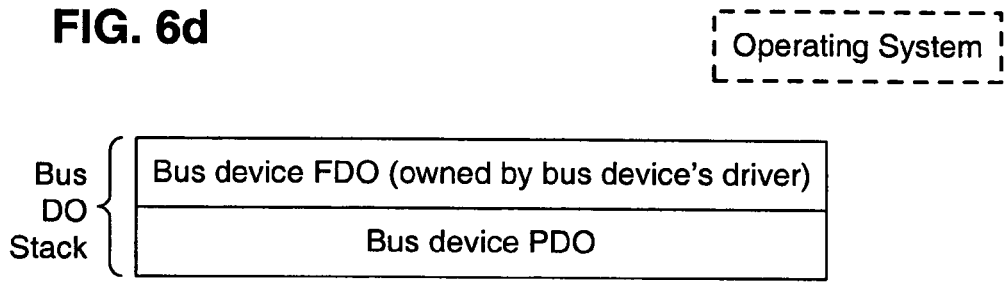

When a child device is unplugged from a bus device's slot or port, the bus device driver notifies the OS of the removal. The OS then sends a sequence of PnP IRPs to coordinate the destruction of the removed device's DO stack. The following describes the sequence of events. FIG. 6a illustrates steps 1 and 2; FIG. 6b illustrates steps 3 and 4; FIG. 6c illustrates steps 5-7; and FIG. 6d illustrates step 8.

1. When the bus device detects the removal of a child device from one of its slots or ports, the bus device's driver calls IoInvalidateDeviceRelations( ) to notify the OS of a change in the set of children.

2. The OS sends a IRP_MN_QUERY_DEVICE_RELATIONS to the top of the bus device's DO stack to get the new set of children.

3. The bus device driver, which owns the FDO of its stack, processes the request. It checks the status of each of its slots or ports and determines which are occupied by a child device. It notices that a device previously detected has disappeared, and removes that device's PDO from the list of children. The PDO itself is not destroyed until step 7.

4. The driver returns the current list of child PDOs to the OS by completing the IRP.

5) The OS compares the new PDO list against its old copy, and notices that a PDO from the old list is absent in the new one. It sends an IRP_MN_REMOVE_DEVICE IRP to the top of the removed child's DO stack.

6) The driver for each of the stack's DOs handles the IRP by destroying that DO, beginning from the top-most one (FDO), which is owned by the child device's driver.

7) After the FDO is destroyed, the IRP is passed to the driver for the next lower DO. The bus driver, which owns the PDO, destroys it.

8) At this point, the child device's stack has been completely destroyed.

Filter Drivers

WDM defines a special type of driver called a "filter driver." A filter driver does not control any particular device. Instead, it interposes a DO (called the "filter DO") between two DOs from a stack. The purpose of interposition is to intercept IRPs launched from the upper DO to the lower DO. The filter DO is also assigned its own ISL in any IRP sent to the stack, so the filter driver can install its own completion function. During IRP completion, the filter driver's completion function is invoked after the lower DO's completion function, but before the upper DO's completion function.

Filter drivers are useful in many applications. First, the ability to intercept IRP launches allows a filter driver to monitor the IRP traffic between layers of a DO stack. By exposing how drivers communicate with each other, this can be valuable for debugging or educational purposes. Second, a filter driver can modify IRPs passed between drivers of a given stack, which allows the filter driver to modify their behavior. For example, during IRP completion, a filter driver may modify the results from a driver for a lower DO, thereby potentially changing the behavior of drivers for upper DOs.

Figure 7:
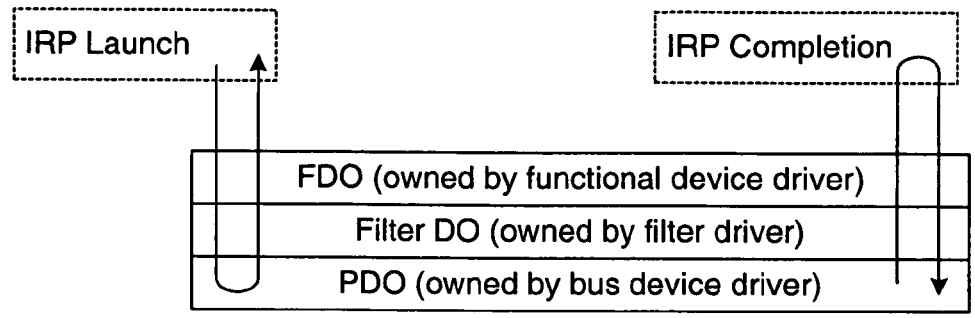
FIG. 7 shows the location of a DO for a filter driver.

Filter drivers must first be registered in the OS's registry before they can be loaded and activated. The mechanism used to register and load filter drivers, including its shortcomings, is described below, and is illustrated in FIG. 7.

Internal Structure of Device Objects and Driver Objects

Every active WDM driver is represented in memory by a data structure called a "driver object," which contains a field named DeviceObject that points to the beginning of a list of device objects owned by that driver. Every device object has a NextDevice field pointing to the next device object in the list. The last device object in the list has a NextDevice value of zero. Every device object also has a field named DriverObject that simply points back to the owning driver object. A device object also has a field named AttachedDevice that points to the next upper device object in the stack. The topmost device object (usually the FDO) has an AttachedDevice value of zero.

Figure 8:
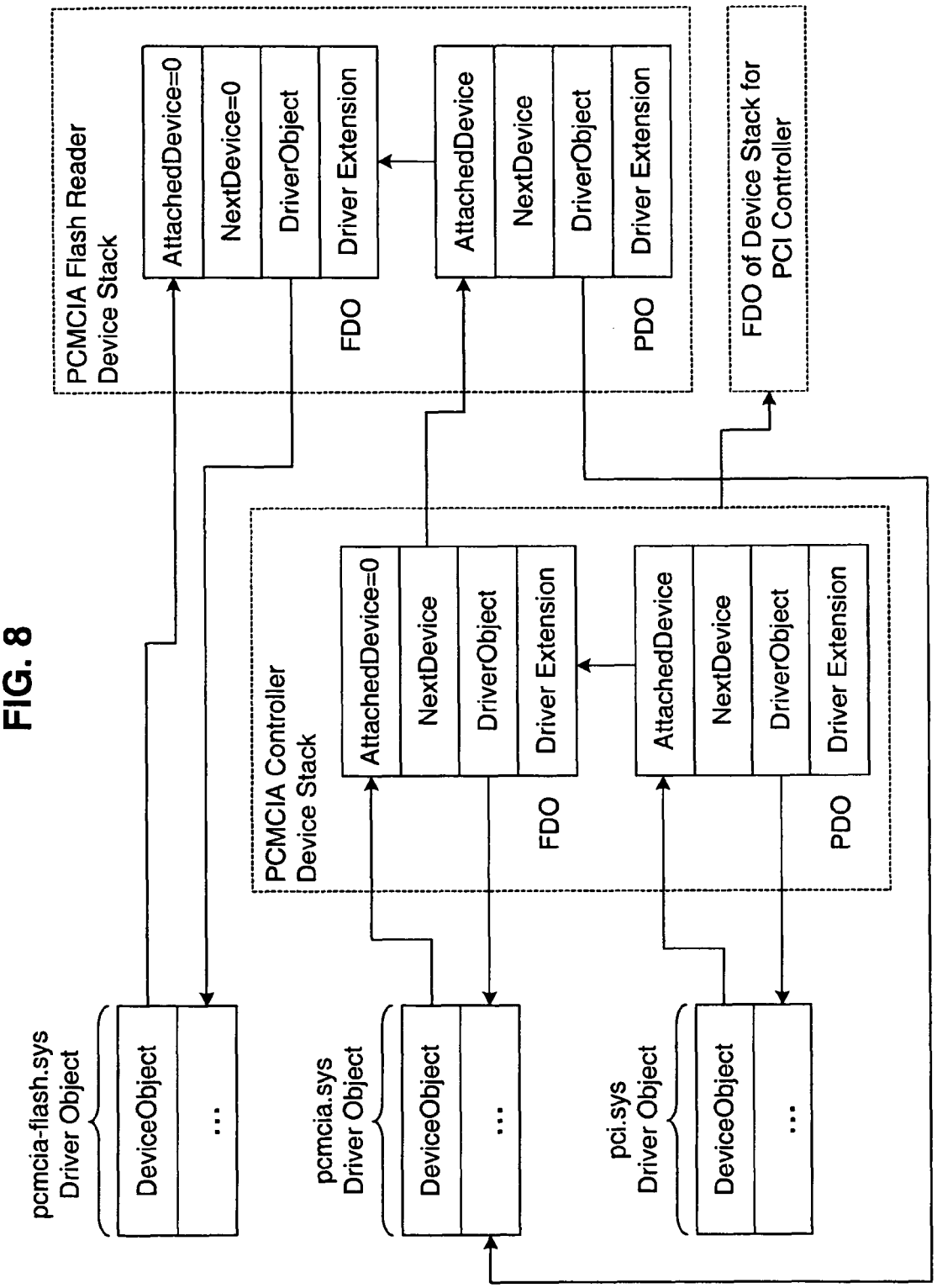
FIG. 8 illustrates the internal structure of device and driver objects.

FIG. 8 illustrates this for the case of a flash card reader device plugged into a PCMCIA slot. A driver object exists for the PCMCIA controller driver (pcmcia.sys) and owns two device objects: the PCMCIA controller's FDO, and the flash card reader's PDO. The driver object for the flash card reader (pcmcia-flash.sys) owns only one device object, namely, the card reader's FDO.

Knowledge of the internal structure of driver objects is useful because, given any device object, it is possible to get the list of all device objects owned by the same driver, using the following algorithm:

1. Find the driver object using the device object's DriverObject field.
2. Get the list of all device objects owned by this driver by starting with the driver object's DeviceObject pointer, then follow the NextDevice field of each device object in the list until a zero value is reached.

The AttachedDevice field can be used to determine if a given device object is the FDO of its stack as follows:

1. Determine the stack's top-most device object by following the AttachedDevice pointer until a value of zero is reached. The last device object visited is the top-most DO.
2. If the top-most device object is the same as the original one, then the original one is the FDO. Otherwise, it is likely to be the PDO.

USB Architecture

See FIG. 9. The Universal Serial Bus (USB) specification defines how USB devices physically connect to a computer 900. A USB device always attaches to the bus through a "port" belonging to a "hub." The computer's interface to a USB is called a "host controller" 910. The host controller always has a built-in hub called the "root hub" 920, which is equipped with two or more ports 931, 932. A USB device can itself be an external hub 942 with multiple ports 951, 952, allowing up to 127 devices to attach to the bus using the tree topology illustrated in FIG. 9. In FIG. 9, four USB devices are shown by way of example: a camera 941 and the external hub device 942, which are attached to the respective ports 931 and 932 via standard USB cables 933, 934, as well as a keyboard 961 and mouse 962, which are attached to the respective ports 951 and 952.

USB commands, called "transactions," are always initiated by the computer 900 and flow from the host controller 910 to a particular device. A USB transaction comprises the following fields:

1. The type of operation: SETUP for device configuration/query, IN for reading data, or OUT for writing data. SETUP transactions also have a subtype identifying the precise operation to be performed.
2. A device ID specifying the target device.
3. An endpoint ID specifying what endpoint on the device should receive the request.
4. A buffer containing the data to write to the device, or to receive the data to be read.

When a host controller sends a transaction on the bus, hubs repeat the signal on all of their ports, allowing the transaction to reach all devices attached to the tree. Only the device addressed by the transaction's device ID responds, however. From a logical perspective, all devices on the same USB appear to be connected to the same wire, regardless of their position in the physical topology.

Endpoints

Within a USB device, a transaction is always directed to a specific endpoint. Each endpoint can accept only one type of transaction. Every USB device has at least one endpoint called the "default control endpoint," which accepts SETUP transactions. Additionally, a device may have one or more data endpoints capable of accepting either IN or OUT transactions.

Hubs

Hubs are a special class of USB devices. Independent of its manufacturer, any hub device must follow a universal specification defined in the USB Architecture Spec. The specification requires all hubs to:

1. Possess one data input endpoint called the "status change endpoint" (SCE). When read (with an IN transaction), the SCE returns a number. The meaning of each of the number's bits is defined in the USB Architecture specification. This number's most important property in the context of this invention is that its value changes whenever the state of any of the hub's ports changes. A port's state includes its current connection state, which indicates whether a device is attached to that port. Thus, device additions and/or removals from a hub can be detected by polling its SCE and noticing a change in its value.
2. Respond to a set of hub-specific SETUP transactions on the default control endpoint. One of the transaction subtypes, named GET_STATUS, can be used to read the state of a specific port.

Device Descriptor

Every USB device has a "device descriptor," which is a data structure that can be read using a SETUP transaction with GET_DESCRIPTOR subtype. The device descriptor is used to identify a device and determine its capabilities. Its fields include the device's vendor ID and product ID, which can be used to construct the device's WDM hardware ID.

USB WDM Drivers

WDM defines a framework and set of rules governing how USB drivers operate. The framework distinguishes between three types of drivers:

1. Host controller (HC) drivers, responsible for specific USB HC hardware devices. Three HC types currently exist in the industry: UHCI (Universal Host Controller Interface, by Intel Corp.), OHCI (Open Host Controller Interface, by a consortium of vendors), and EHCI (Enhanced Host Controller Interface). The corresponding drivers are typically named uhci.sys, ohci.sys, and ehci.sys.
2. A common hub driver generally named usbhub.sys, managing all hubs including both the root hub and external hubs.
3. USB device drivers, responsible for non-hub USB devices.

Host controller drivers and the hub driver are essential to the setup and operation of USB device object stacks within the WDM framework. Moreover, they provide the mechanisms that enable USB device drivers to send transactions to specific devices. For these reasons, a WDM OS is required to supply both the HC drivers and the hub driver. In contrast, USB device drivers are generally supplied by the device vendor/manufacturer and are packaged together with the device hardware.

Figure 10:
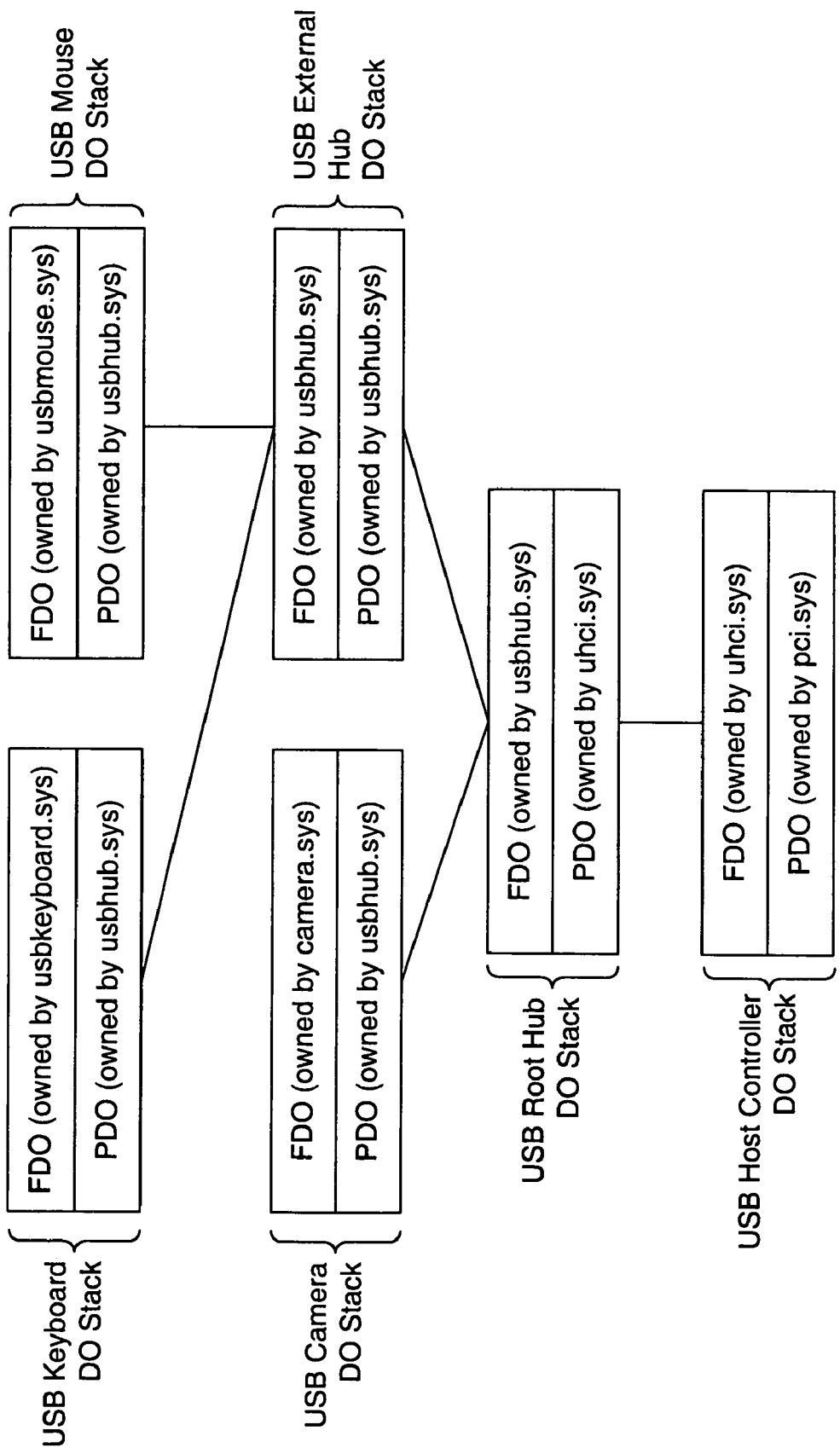
FIG. 10 shows an example of a USB device tree that corresponds to the physical topology example shown in FIG. 9.

FIG. 10 shows the USB device subtree corresponding to the physical topology example of FIG. 8: The root hub is treated as an independent hub and is assigned its own DO stack. The HC is assumed in this example to be a UHCI controller attached to a PCI slot, which explains why its PDO is owned by the pci.sys driver. An important observation is that every USB device is the child of a hub. Therefore, the hub driver owns the PDO of every USB device's stack. This point is essential in the following discussion of how USB Request Blocks (URBs) are dispatched.

USB Request Blocks (URBs)

In order to communicate with a device that it controls, a USB device driver must create and launch a special IRP called the "USB Request Block" (URB), which encodes the desired USB transaction. Once a URB is created, the USB device driver sends it to the DO immediately below the device's FDO.

Figure 11:
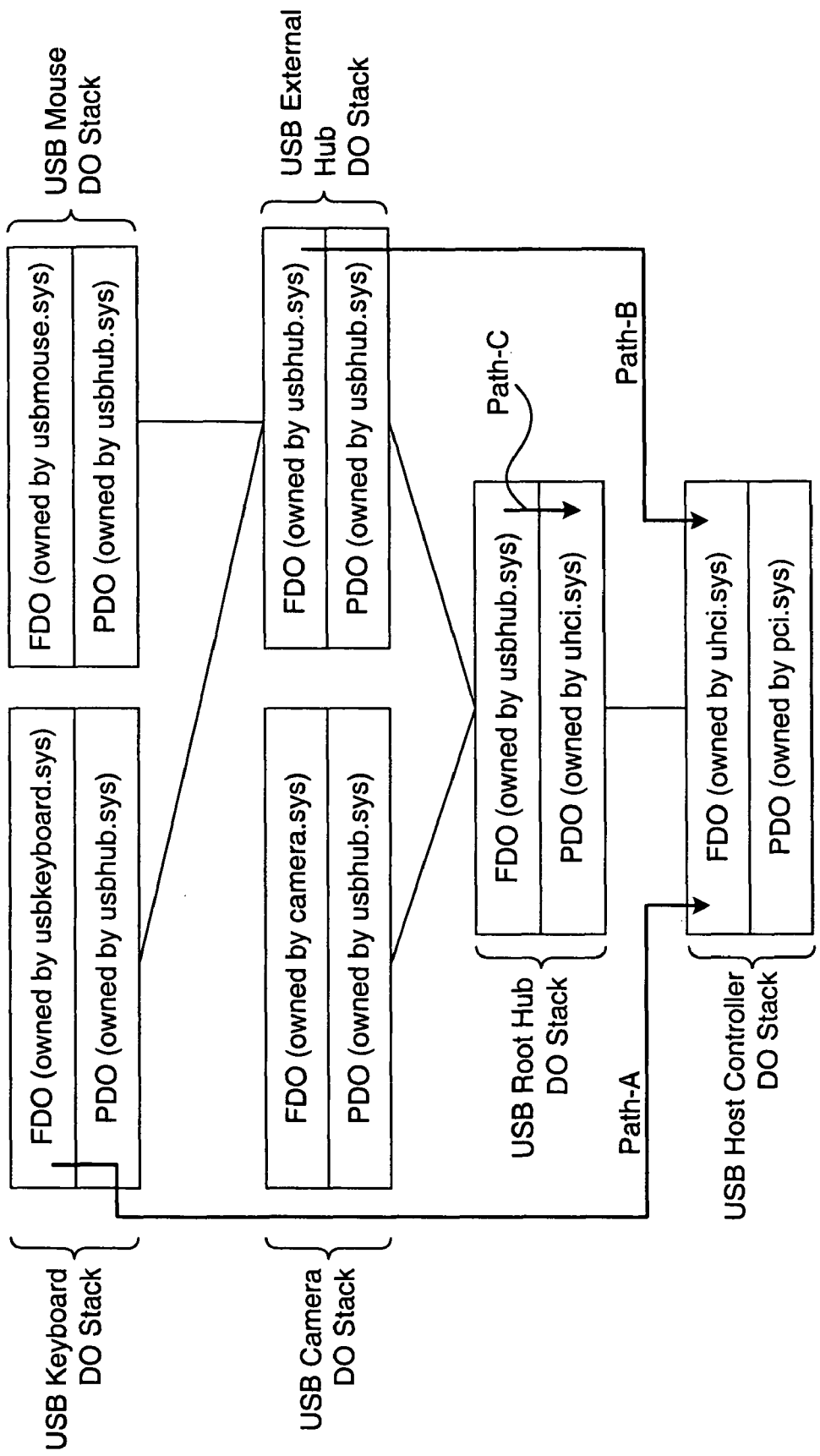
FIGS. 11 and 12 illustrate the paths that may be taken by a USB Request Block (URB) in a computer running the Microsoft Windows 2000 and Microsoft Windows XP operating systems, respectively.

A URB always ends up being processed by the HC driver. The exact path a URB takes is implementation-dependent and specific to a particular WDM-compliant OS. FIG. 11 illustrates the procedure on a system running the Microsoft Windows 2000 operating system. FIG. 11 shows the path (labeled Path-A) for a URB sent from the USB keyboard's stack from the running example. First, the hub driver owns the stack's PDO, so it receives the URB when it reaches the bottom of the stack. Whenever the hub driver receives a URB sent to any of its PDOs, it automatically forwards the URB to the HC's FDO, which is owned by the HC driver. A URB sent from an external hub's stack follows a similar path, as shown as Path-B in FIG. 11. The root hub's stack can also send URBs, shown as Path-C in FIG. 11. In this case, the HC driver already owns the stack's PDO and receives the URB immediately, with no need for further forwarding.

Figure 12:
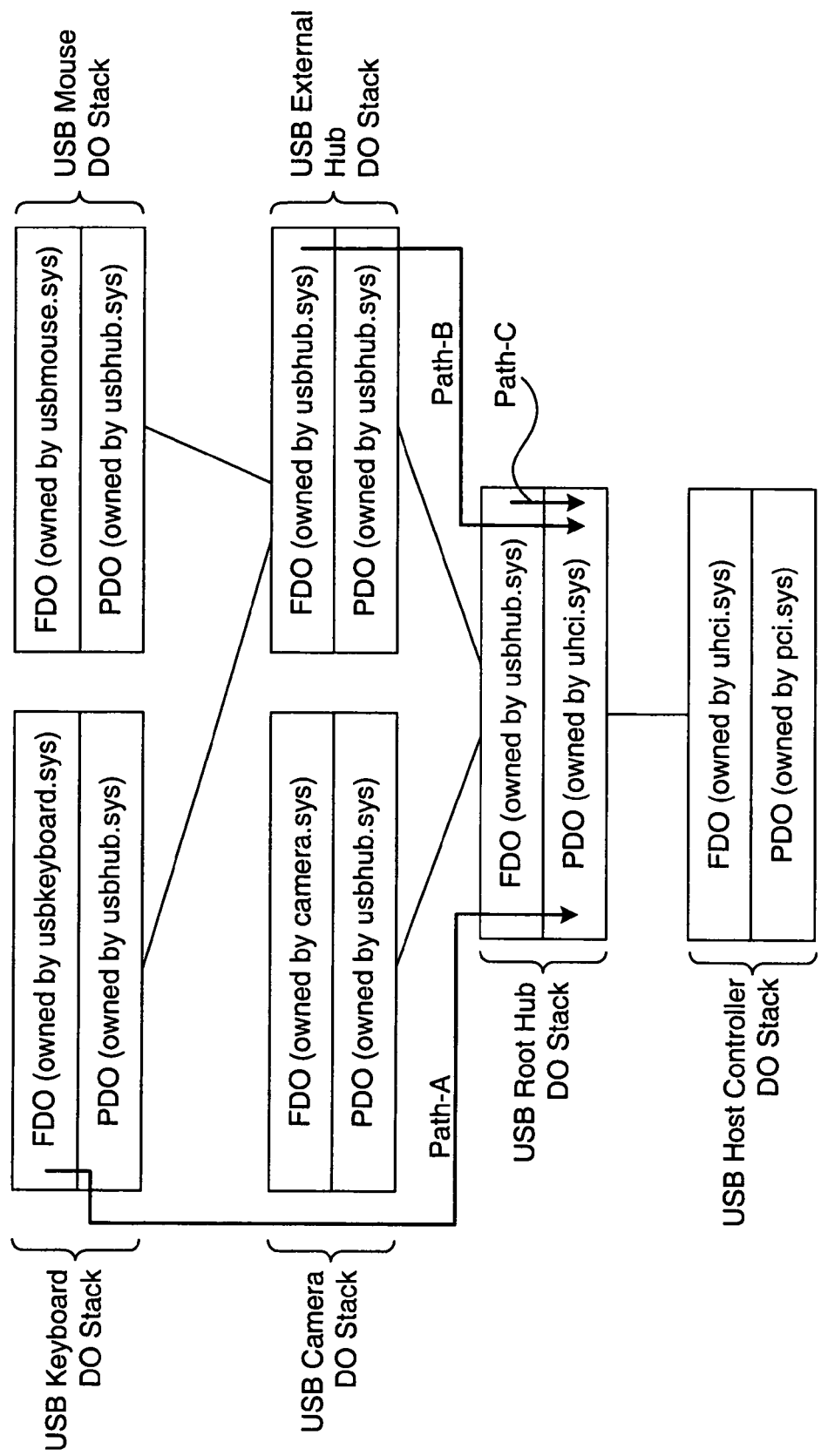

URBs take a simpler path on the Windows XP OS, as illustrated in FIG. 12. Any URB sent to a PDO belonging to the hub driver is automatically forwarded to the root hub's stack. The HC driver owns the root hub's PDO, so it eventually receives all URBs.

In either case, the HC driver consumes the URB, ending its launch phase. The driver extracts the USB transaction encoded in the URB and then instructs the host controller hardware to transmit the transaction over the actual bus. When the transaction finishes, the driver initiates the URB's completion phase. Eventually, the USB device driver that created the URB processes the transaction's results through its completion handler.

USB Driver Device Handle

Every URB contains a field called UsbdDeviceHandle, which is a number that uniquely identifies a particular USB device. The HC driver maintains a one-to-one mapping between UsbdDeviceHandle values and actual USB device IDs. When the hub driver creates a PDO for a child USB device, it asks the HC driver to allocate a new UsbdDeviceHandle value for the child, then stores it in the driver extension of the child's PDO (see paragraph above on Driver Extensions).

A USB device driver must always use a WDM OS-defined function, such as UsbBuildInterruptOrBulkRequest( ) to construct a URB before sending it down the device's stack. The OS's URB-building functions obtain the correct UsbdDeviceHandle value from the HC and set it in the URB.

When the HC driver receives a URB, it does not know beforehand what device stack the URB originates from. It is the URB's UsbdDeviceHandle that allows the HC driver to determine the correct device ID to set in the USB transaction to be transmitted over the bus.

The exact location (that is, offset) of the UsbdDeviceHandle field in a driver extension can be obtained from the OS vendor, or can easily be determined by experimentation. The experimentation technique involves observing URBs using a filter driver (see paragraph on Filter Drivers), extracting each URB's UsbdDeviceHandle (the location of the UsbdDeviceHandle field within a URB is publicly known), and then scanning the PDO's driver extension for a number matching that value.

The root hub is a special case in that it is not a true USB device. By convention, its UsbdDeviceHandle value is always zero.

Device Creation

Since every USB device is the child of a hub (with the exception of the root hub, which isn't truly a device of its own), the hub driver acts as the bus driver responsible for orchestrating the creation and destruction of most USB-related device object stacks.

Figure 13A:
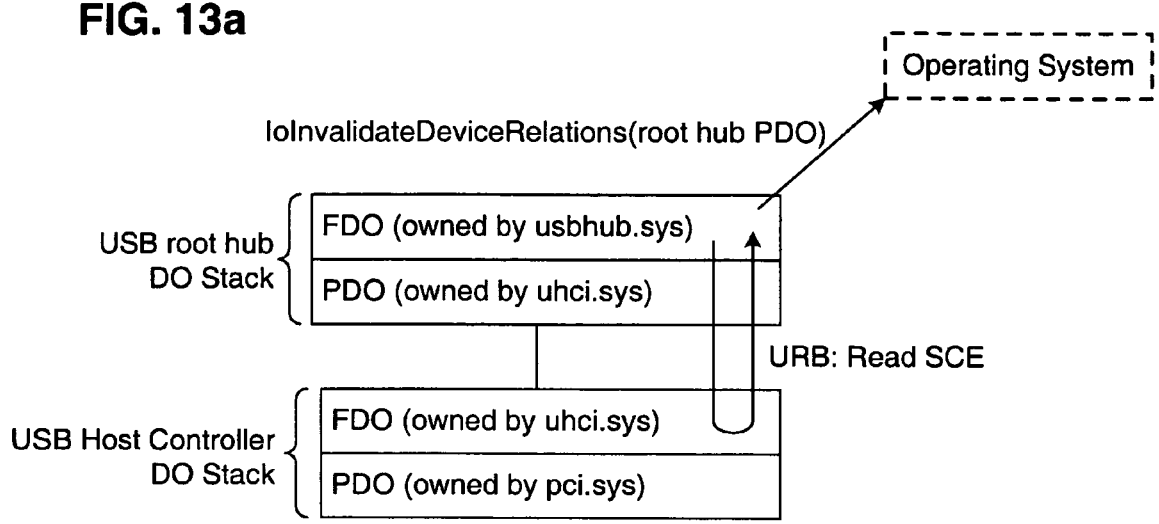
FIGS. 13a-13e illustrate various steps involved in the creation of a USB device object stack.
Figure 13B:
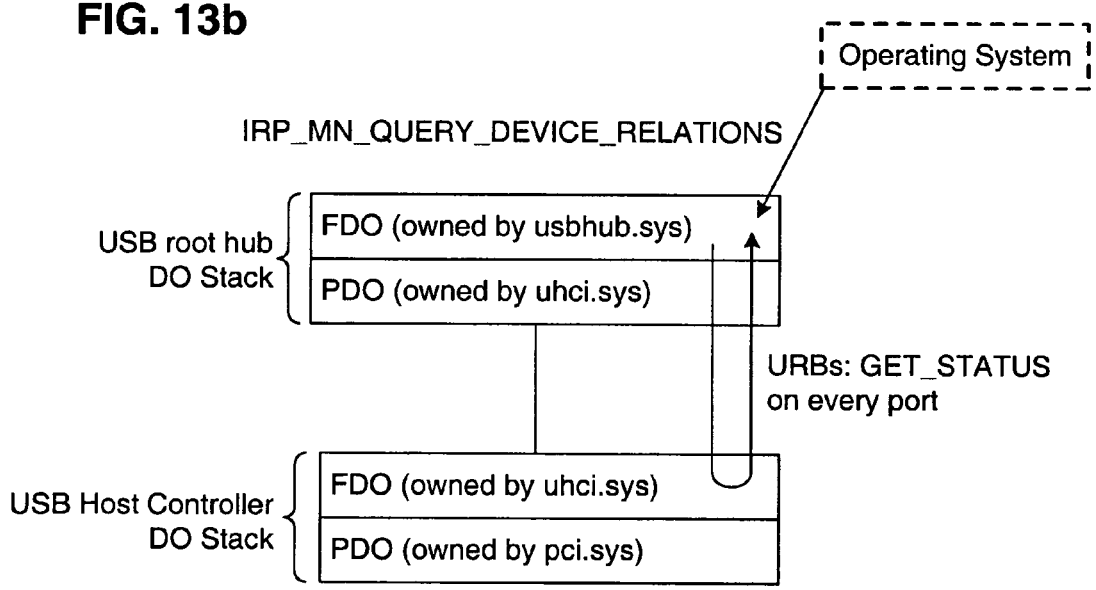
Figure 13C:
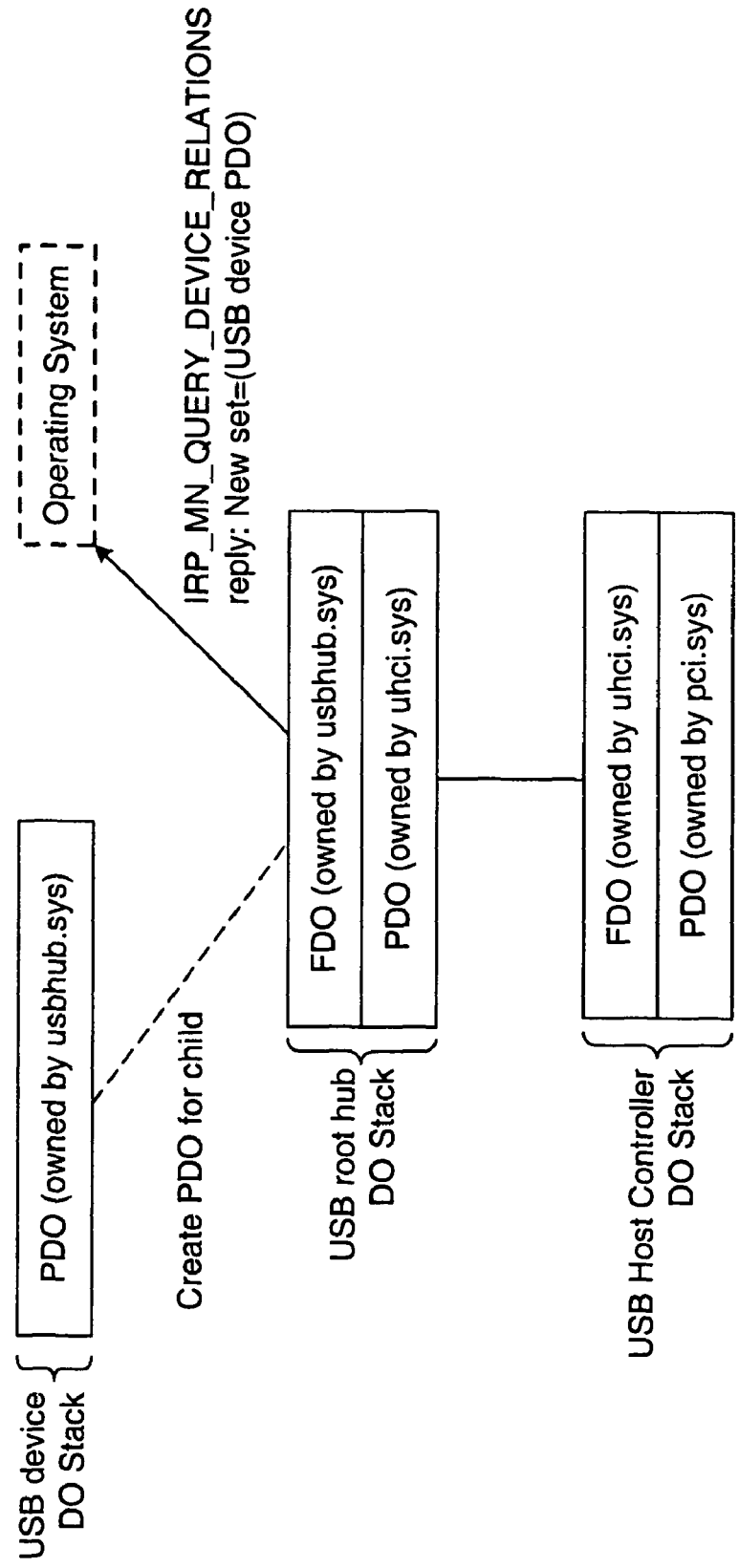
Figure 13D:
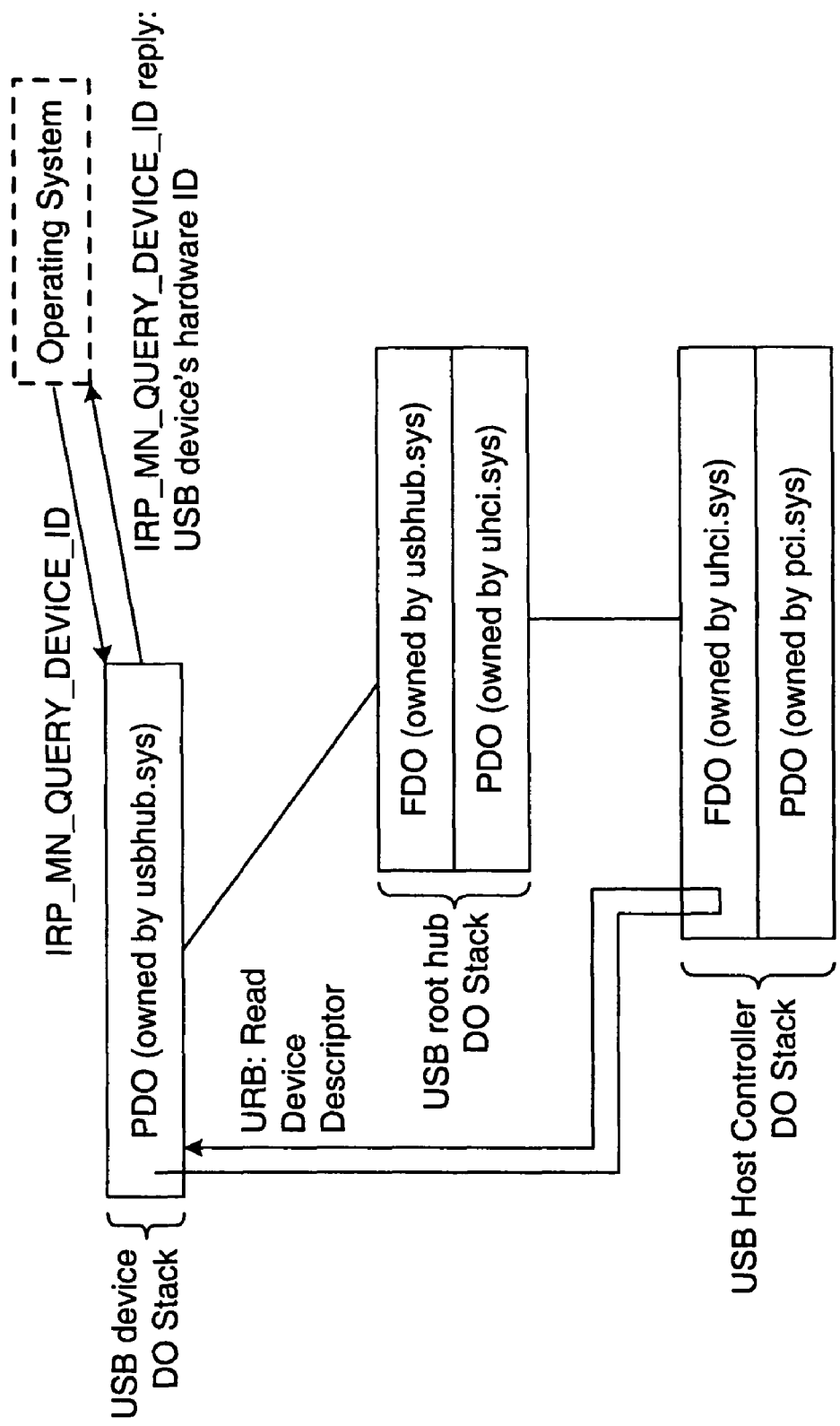
Figure 13E:
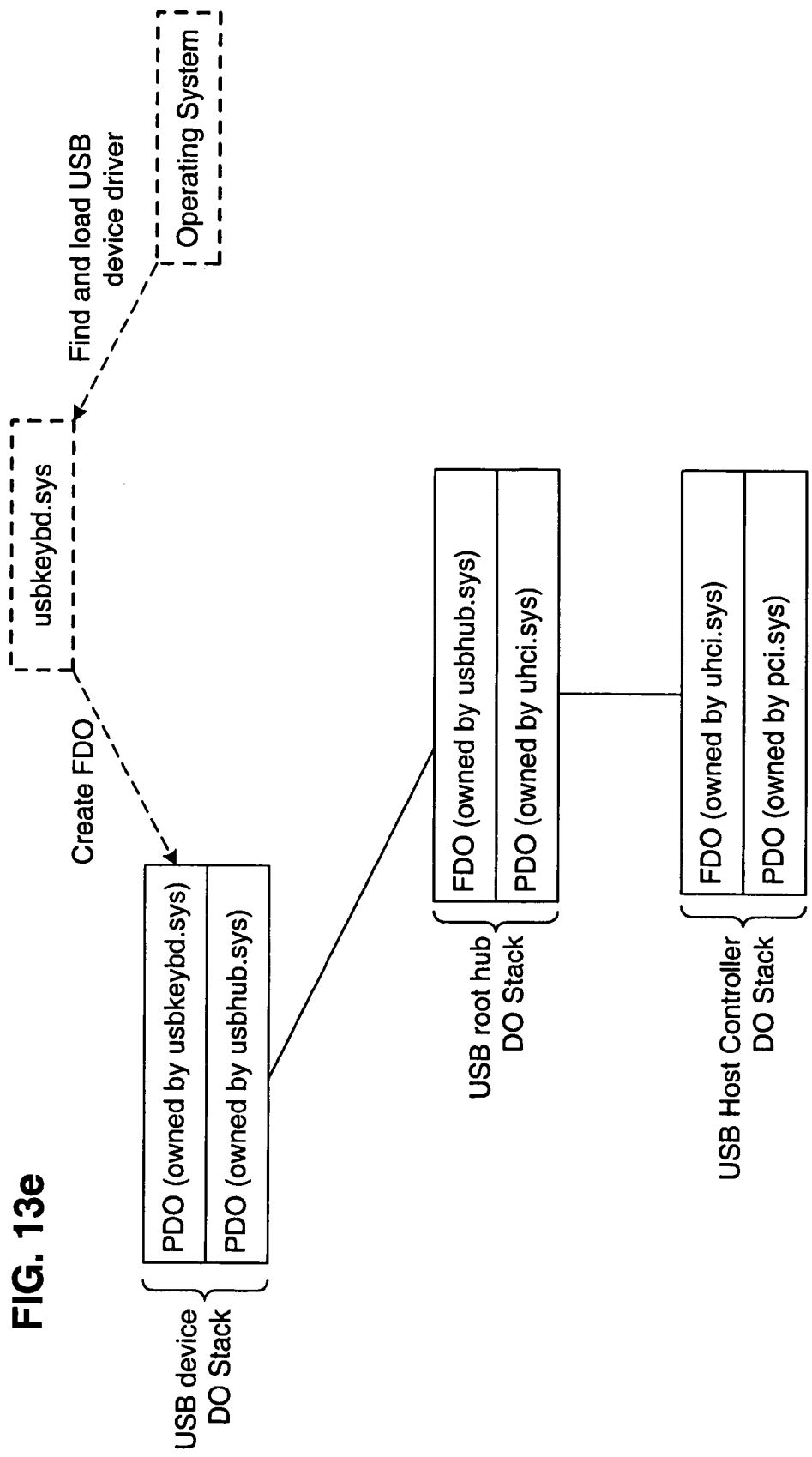

The process for creating a DO stack for a new child device follows the general WDM sequence described earlier in "Device Object Stack Creation." The following list re-iterates the process, but with details specific to USB devices. FIG. 13a illustrates steps 1 and 2; FIG. 13b illustrates steps 3 and 4; FIG. 13c illustrates steps 5 and 6; FIG. 13d illustrates steps 7-9; and FIG. 13e illustrates steps 10 and 11.

1. For every present hub device (including the root hub), the hub driver periodically sends a URB encoding an IN transaction on the hub's SCE.

2. When the value of a hub's SCE changes, indicating that a device has been attached or removed, the hub driver calls IoInvalidateDeviceRelations(hub PDO) to notify the OS that the hub's set of children might have changed.

3. The OS sends a IRP_MN_QUERY_DEVICE_RELATIONS to the hub's stack to retrieve the new set of children.

4. The hub driver owns the hub's FDO, so it receives the IRP. In order to compute the current set of children, the driver looks up the state of each of the hub's ports. For every port, it sends a URB encoding a SETUP transaction with GET_STATUS subtype and additional information specifying the port number to query. The URB returns a number whose bits represent individual port states. One of those bits, named PORT_CONNECTION, represents the port's connection state. The bit has value 1 if a device is attached, and 0 otherwise.

5. Assuming that a new device has been attached, the hub driver creates a PDO representing the new child and adds it to the list of children for this particular hub. The driver also sends another URB to the hub device to reset the new child device so that it starts in a clean initial state.

6. The hub driver then returns the new set of child PDOs to the OS by completing the IRP_MN_QUERY_DEVICE_RELATIONS IRP.

7. The OS notices that a new PDO has been added to the hub's list of children, and sends an IRP_MN_QUERY_ID IRP to the new PDO.

8. The hub driver owns the new device's PDO, so it receives the IRP. The driver sends a URB to query the new device's device descriptor.

9. A hardware ID is constructed from the descriptor's vendor ID and product ID, then returned to the OS by completing the IRP_MN_QUERY_ID IRP.

10. The OS looks for a USB device driver capable of supporting the new child's hardware ID. Assuming that it finds one, the driver is loaded into memory and activated.

11. The USB device driver creates the child's FDO and stacks it on top of the existing PDO.

12. The OS sends an IRP_MN_START_DEVICE IRP to the top of the new stack.

Driver Substitution

Figure 14A:
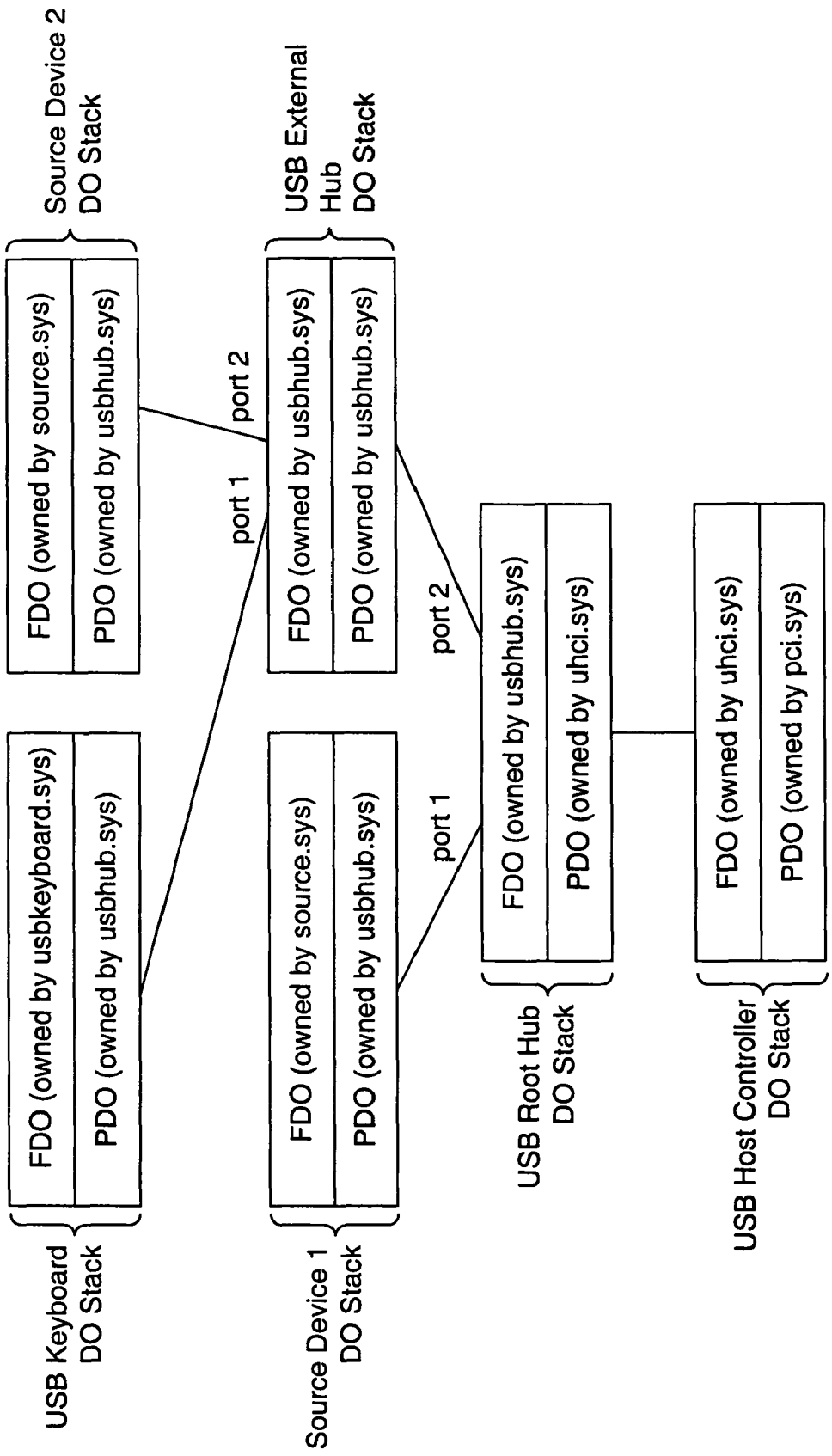
FIGS. 14a and 14b illustrate the state of a stack of USB device objects before and after driver substitution according to the invention.

Now suppose two identical USB devices with hardwareID equal to sourceID are attached to the USB. This situation is illustrated in FIG. 14a, in which two DO stacks have already been created for the devices "Source device 1" and "Source device 2." The same USB device driver, here named "source-.sys" by way of example, owns the FDO of both stacks. Each of the two devices may be attached to any port belonging to any hub, such as ports 1 and 2 shown in FIG. 14a.

Figure 14B:
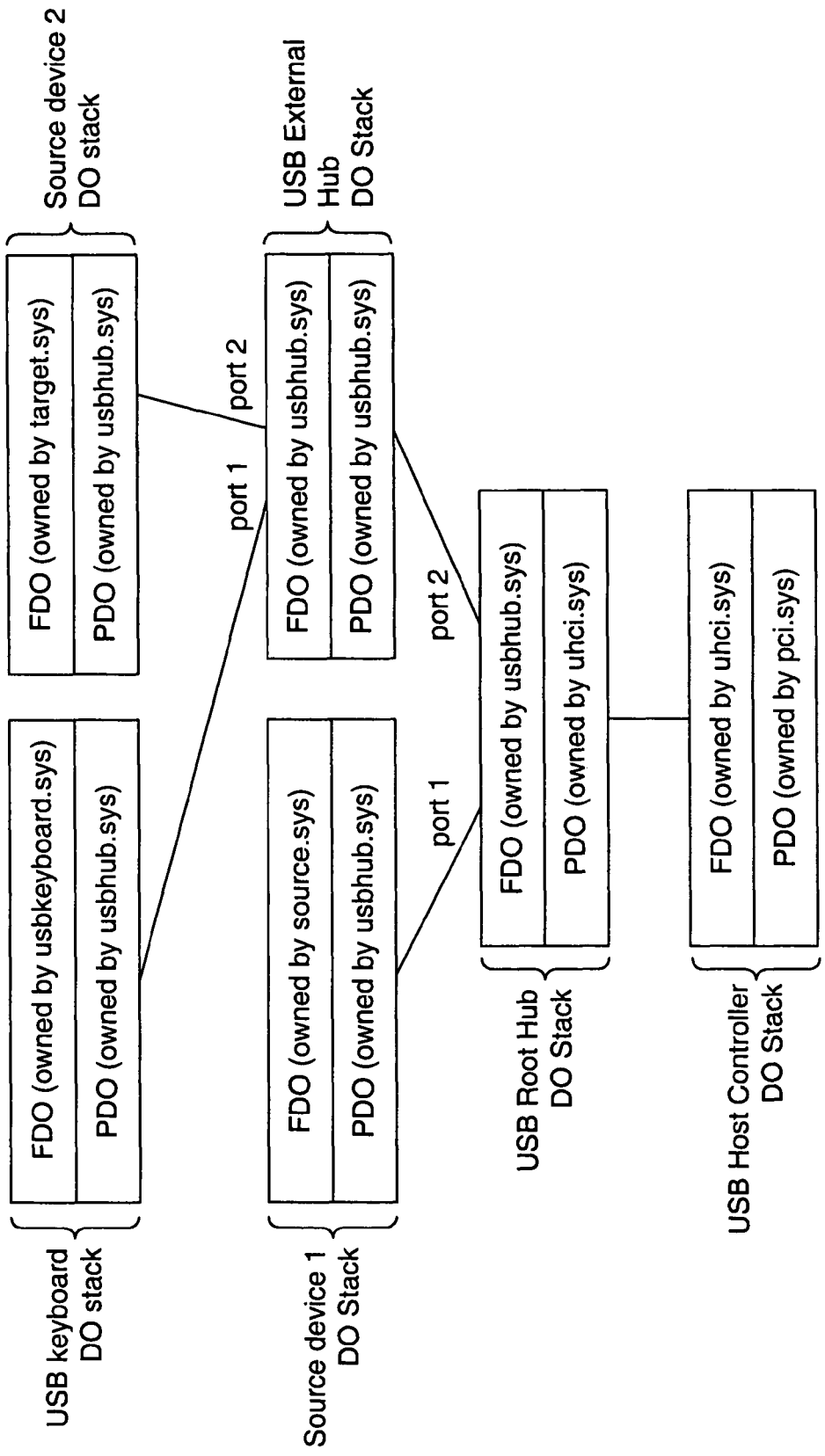

Using the invention, an application is able to substitute a new driver named, for example, "target.sys" for one of the existing source devices, without affecting the other source device. FIG. 14b illustrates the resulting WDM tree after taking over the second source device. Note that the driver source.sys of Source device 2 has been replaced by target.sys. Driver substitution according to the invention allows software to operate a device in new ways not permitted by the old driver, as explained above.

For conciseness, the driver substitution operation according to the invention is called an ACQUIRE operation. The invention also supports the inverse operation, called RELEASE. A RELEASE cancels a previous ACQUIRE operation by allowing the original driver that was replaced to regain control of the device. The invention has two primary components: a general IRP filtering mechanism that overcomes the limitations of WDM filter drivers, and a program module named "agent" that uses the filtering mechanism to provide the dynamic USB driver substitution capability according to the invention.

The general IRP filtering mechanism allows a driver program to observe and potentially modify IRPs sent to or returned by any driver in the system. The agent takes advantage of this mechanism to manipulate the OS and its USB driver subsystem and to cause them to destroy the existing device object stack for a selected USB device, then create a new stack, but with a different FDO driver. The agent achieves this by fabricating the following sequence of events:

1. The agent simulates the removal (unplug) of the device. This leads the OS and USB hub driver to destroy the device's stack, thereby decoupling the existing driver from this device. The simulation begins by notifying the OS of a change in a hub's set of child devices. This forces the hub driver to rescan the state of each hub port, leading to the dispatch of multiple GET_STATUS URBs. The agent intercepts the URB corresponding to the device's port, and modifies its result to indicate that the device is not present.

2. The agent simulates the reattachment (plug-in) of the device. The simulation involves notifying the OS of another change in the hub, which causes the hub driver to rescan hub ports again. This time, no URBs are modified, and the device appears to have been reattached after it was unplugged. This causes the OS and USB hub driver to initiate the creation of a new stack for the device.

3. When the OS reads the device's hardware ID to determine which driver to load for the device, the agent modifies the result of the corresponding IRP_MN_QUERY_ID packet and replaces the true ID with a fabricated ID mapping to a new driver. This allows the new driver to load and create the device's FDO.

The invention does not have the prior art's shortcomings. The driver substitution operation may be localized to a single device; other instances of the same device with the same hardware ID are not affected; and no existing registry mapping is modified. The invention also supports any type of USB device because it requires no hardware support.

The general IRP filtering mechanism according to the invention will be discussed in detail first, followed by a description of the agent that uses it.

General IRP Filtering Mechanism

Dynamic driver substitution according to the invention requires a mechanism for observing and potentially modifying IRPs sent up and down an arbitrary DO stack. This capability is generally referred to as "filtering." As mentioned earlier (FIG. 7 and accompanying text), WDM supports a special type of driver called "filter driver," specifically to support IRP filtering. Unfortunately, a filter driver has a limitation that makes it inadequate for the dynamic driver substitution. In order to understand this limitation, consider how a WDM operating system activates a filter driver.

Before a filter driver can be used, it must first be registered using a special entry in the WDM operating system's registry. This entry a) notifies the operating system of the existence of the filter driver and its file name (for example, filter.sys); b) specifies the name of the functional driver whose IRPs are to be filtered; and c) specifies whether the filter driver is an upper or lower filter. If the filter driver is of type upper, its DO will be placed above the functional driver's DO. If the filter is of type lower, its DO will be placed immediately below the functional driver's DO.

Figure 16A:
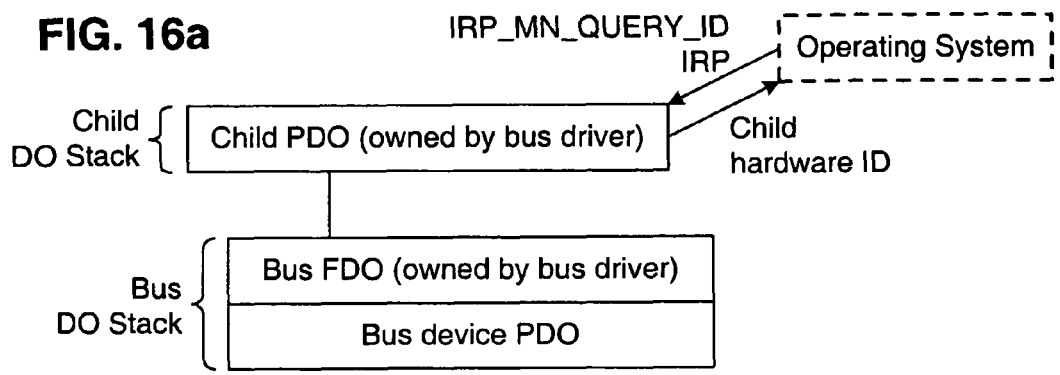
FIG. 16a illustrates device stack creation according to the Windows Driver Model.

A WDM operating system activates a filter driver by creating a DO on its behalf and inserting it into a DO stack when the stack is constructed for a new device. Recall the DO stack creation steps previously illustrated in FIGS. 5a-5f. FIG. 16a, which is similar to FIG. 5d, illustrates the stack for a new device being constructed. The bus driver has created the PDO. In order to construct the rest of the stack, the operating system sends the PDO an IRP_MN_QUERY_ID IRP, asking the bus driver to identify the new device. The bus driver completes the IRP with the device's hardware ID. The operating system identifies the functional driver associated with this hardware ID, creates a FDO on its behalf, then places the FDO on top of the PDO.

Before attaching the functional driver's FDO to the stack, the operating system checks to see if any registered filter driver is associated with that particular functional driver. If there is, then a DO is created for the filter driver and is inserted between the PDO and FDO (in the case of a lower filter driver) or above the FDO (in the case of an upper filter driver).

Figure 16B:
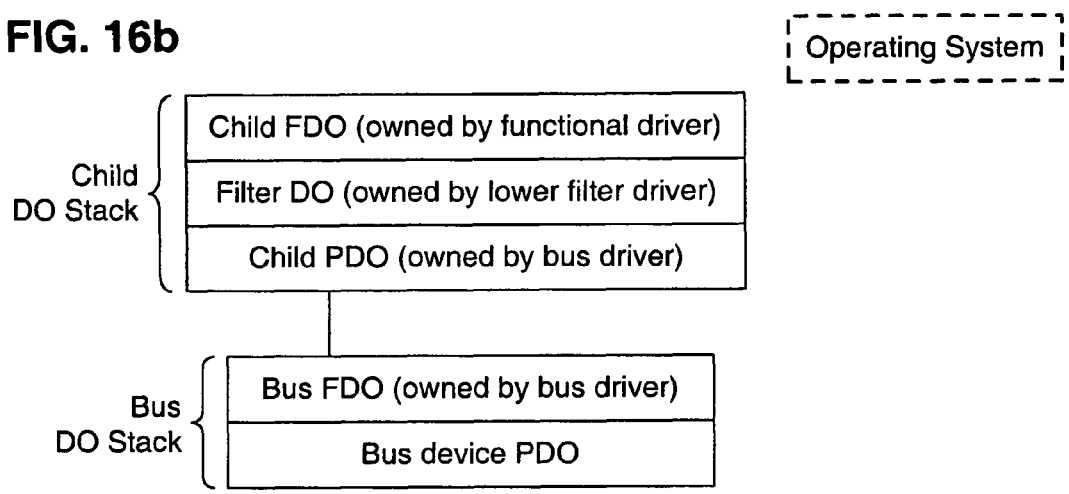
FIG. 16b illustrates device stack creation with a lower filter driver.

FIG. 16b illustrates the final device object stack when a lower filter driver is involved. Once the stack is fully constructed, the filter driver is capable of observing all IRPs coming from the FDO, not only those IRPs launched from above, but also the completion of those same IRPs coming back up once they've been processed by the lower DOs (and thus drivers) in the stack (see FIG. 7).

Unfortunately, there are IRPs that cannot be filtered by a filter driver. In FIG. 16a, for example, the IRP_MN_QUERY_ID IRP the operating system has sent to the child PDO cannot be observed because the filter DO does not yet exist.

Figure 16C:
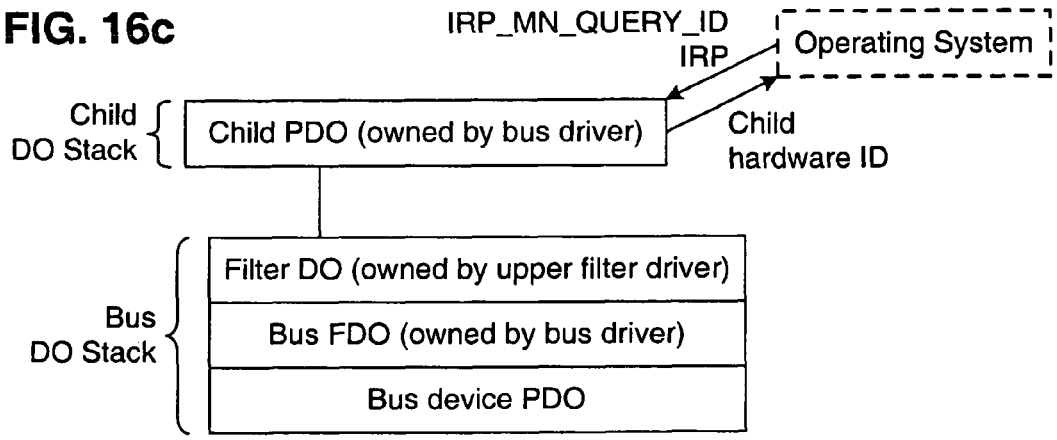
FIG. 16c illustrates device stack creation with an upper filter driver on a bus driver.

One might think this problem could be solved using an upper filter driver associated with the bus driver. After all, the bus driver also acts as a functional driver for the FDO in the stack for the bus device. FIG. 16c illustrates the equivalent of FIG. 16a, with the addition of an upper filter associated with the bus driver. Unfortunately, this still doesn't allow the IRP_MN_QUERY_ID IRP to be filtered: Even though both the child PDO and bus FDO belong to the same bus driver, the filter driver can intercept IRPs sent to the bus driver only through the filter DO. In FIG. 16c, the filter DO is placed above the bus FDO, not above the child PDO, so IRPs sent to the child PDO cannot be filtered.

To summarize, a filter driver's filtering ability is restricted by the placement of its filter DO. Most existing WDM operating systems allow a filter DO to be placed relative to a FDO only during the final phase of a DO stack's construction, thus making them incapable of observing certain types of IRPs, such as the ones exchanged between the operating system and a bus driver during the early phases of stack creation.

IRP_MN_QUERY_ID is one of the two IRPs that the invention's agent component (described below) needs to filter. To overcome the limitations of conventional filter drivers, the invention includes a general filtering mechanism allowing any IRP sent to any driver to be observed and possibly modified. The IRP can be intercepted both when it is launched and traveling downwards in a stack, and when it is being completed and traveling upwards.

Filtering IRP Launch

Figure 16D:
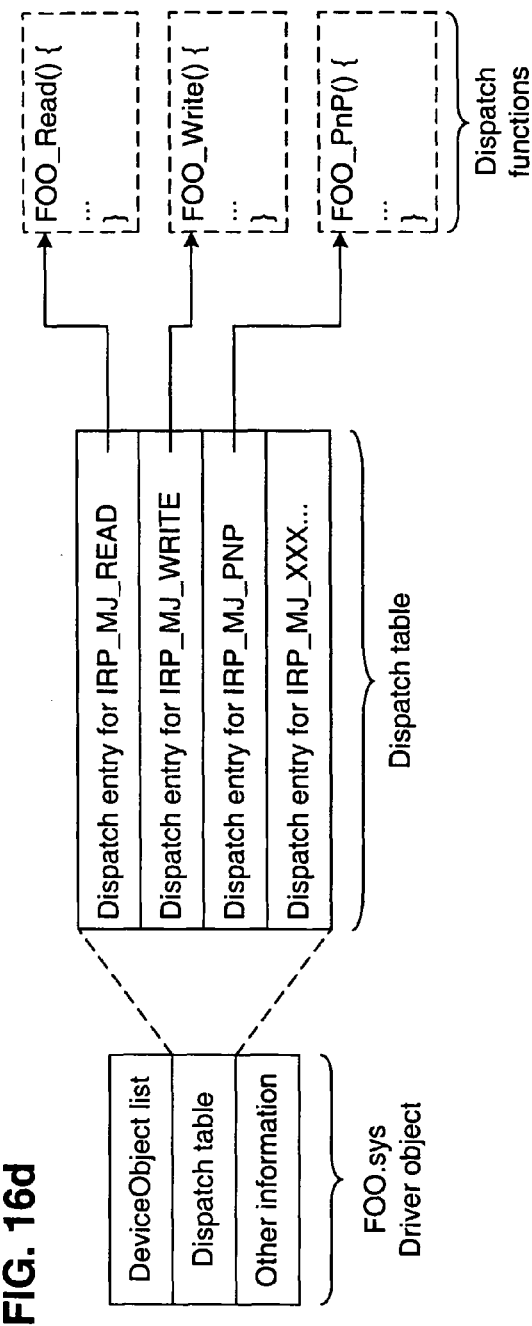
FIG. 16d illustrates a dispatch table for a hypothetical driver.

Recall that a WDM operating system maintains an in-memory data structure called "driver object" for every loaded driver, and that driver object contains a "dispatch table." A dispatch table contains one entry per IRP major code, and each entry has a pointer to a "dispatch function" in the driver, which is responsible for handling all IRPs of a given major code. Whenever an IRP is sent downwards to the next lower device object in a stack, the operating system determines the driver which owns that device object, extracts the IRP's major code, uses that major code as an index into the driver's dispatch table, and then calls the correct dispatch function, passing it a pointer to the IRP and a pointer to the device object. FIG. 16d illustrates the dispatch table of a hypothetical driver named FOO.sys.

A detailed discussion of the launch phase is provided above. To summarize, during the launch phase, a dispatch function may choose to:

1. Continue the launch phase by passing the IRP down to the next lower device object, using the WDM system call IoCallDriver( ) or 2. Terminate the launch phase by taking ownership of the IRP, and returning a STATUS_PENDING code.

To filter IRPs launched to a particular driver, the invention's general filtering mechanism modifies certain entries in the driver's dispatch table. Suppose a software module named MyFilter wishes to observe all IRP_MN_QUERY_ID IRPs launched to driver FOO of FIG. 16d. It first needs to locate the driver object associated with FOO. It can easily do this using WDM operating system services such as IoGetDeviceObjectPointer( ) and reading a device object's DriverObject pointer, as described in detail below concerning the agent component.

Figure 16E:
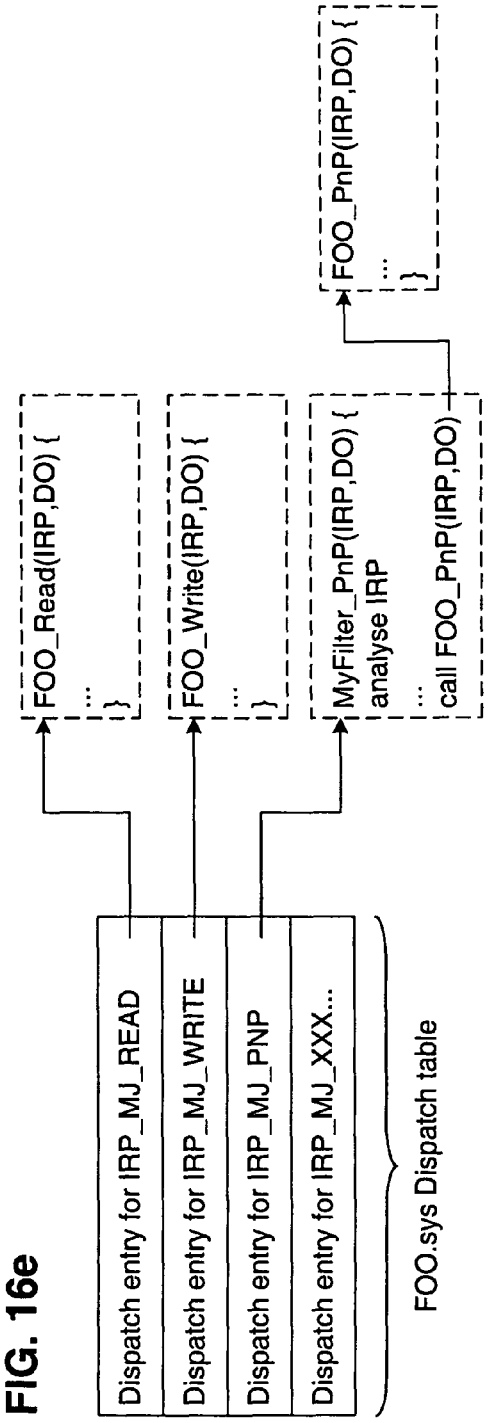
FIG. 16e illustrates interception of an IRP at launch time.

It is known that the major code for the IRP_MN_QUERY_ID IRP is IRP_MJ_PNP (because it is a plug-and-play class IRP). MyFilter replaces the dispatch entry for IRP_MJ_PNP with a pointer to its own dispatch function MyFilter_PnP( ), as shown in FIG. 16e. Before overwriting the entry, the old dispatch pointer is saved in a memory location private to MyFilter.

With this change, any IRP with major code IRP_MJ_PNP launched to FOO is now intercepted by MyFilter_PnP( ), which will typically perform the following steps:

1. Inspect the IRP to decide if it's "interesting" to MyFilter that is, worth analyzing. Examples of IRPs that may not be interesting from a filtering perspective include:

a) IRPs that don't have the desired minor code. In the illustrated example, only IRPs with minor code IRP_MN_QUERY_ID are interesting. IRPs with the same major code (IRP_MJ_PNP) but a different minor code can be ignored and directly forwarded to FOO_PnP( ) in step 3 (see below).

b) IRPs that are sent to the "wrong" device object. Recall that a driver may own multiple device objects. For example, the USB hub driver (usbhub.sys) owns the FDO of the root hub device, but also the PDOs of all child USB device stacks. If the filtering code is interested only in IRPs sent to a particular device object, it can check the device object pointer passed to the dispatch function and ignore the IRP if the device object pointer does not match the desired one.

2. Decide whether the IRP will need to be intercepted again during its completion phase. This step is described in greater detail below in the discussion of completion filtering.

3. Forward the IRP to FOO by passing it to the dispatch function referenced by the saved dispatch pointer, that is, FOO_PnP( ). The call to FOO_PnP( ) must include the same arguments passed to MyFilter_PNP( ) (a pointer to the IRP and a pointer to the device object the IRP is being launched to). The call must be a direct call through a function pointer, and must not use the WDM operating system service IoCallDriver( ), because MyFilter does not have its own device object in the device stack (it is not a true filter driver as recognized by the WDM operating system). In other words, from the operating system's perspective, and all other drivers, MyFilter does not exist, so MyFilter must preserve the IRP launching behavior and rules which they expect. This third step ensures that the original driver keeps functioning normally. Neither the FOO driver nor the WDM operating system are aware that the filtering is taking place.

Filtering IRP Completion

While the ability to observe an IRP at launch time can be valuable, for example, for statistics collection purposes, the ability to observe it during the completion phase is even more useful because it allows the observer to examine and/or modify the results of an IRP after it has been processed by the filtered driver, or drivers further down in the stack.

Recall that IRP completion is managed by a table of IRP Stack Locations (ISLs) embedded in every IRP (see FIG. 4). When a dispatch function belonging to a driver (say, driver D3) receives an IRP, the "completion function" and "context argument" fields in the current ISL will have been set up by the previous driver (say, D2), that is, the one controlling the device object above the current one. During the completion phase, once D3 is finished with the IRP and completes it with the WDM operating system service called IoCompleteRequest( ), the operating system forwards the IRP to the completion function specified by the current ISL and passes it a pointer to the IRP and the context argument from the same ISL, then decrements the ISL marker.

In the illustrated example, suppose that FOO is the D3 driver, and that MyFilter wishes to observe the completion of any IRP processed by FOO that was considered "interesting" during the launch phase. When MyFilter_PnP( ) is invoked in place of FOO_Filter( ), the current ISL's completion function and context argument fields belong to D2, the driver that passed the IRP down to FOO. To intercept the future completion of this IRP, MyFilter_PnP( ) must perform the following operations in step 2 above:

a) Create a temporary ISL data structure in memory. This ISL is isolated and does not belong to any ISL table.

b) Copy the current ISL's completion function and context argument fields to the temporary ISL.

c) Overwrite the current ISL's completion function with a pointer to MyFilter_Completion°, a completion function belonging to MyFilter.

d) Overwrite the current ISL's context argument field with a pointer to the temporary ISL.

Figure 16F:
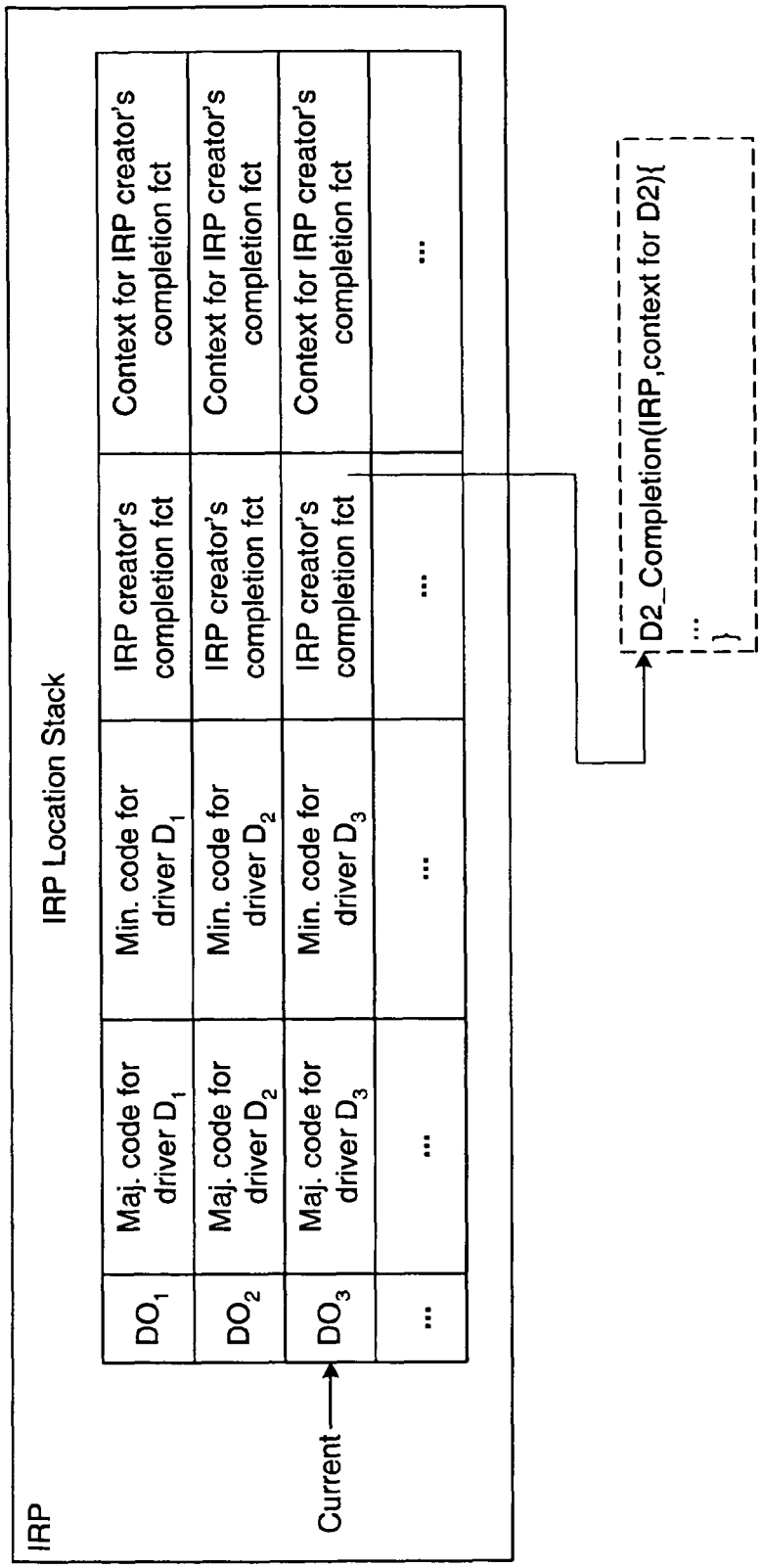
FIG. 16f illustrates the normal case for an IRP stack location table.
Figure 16G:
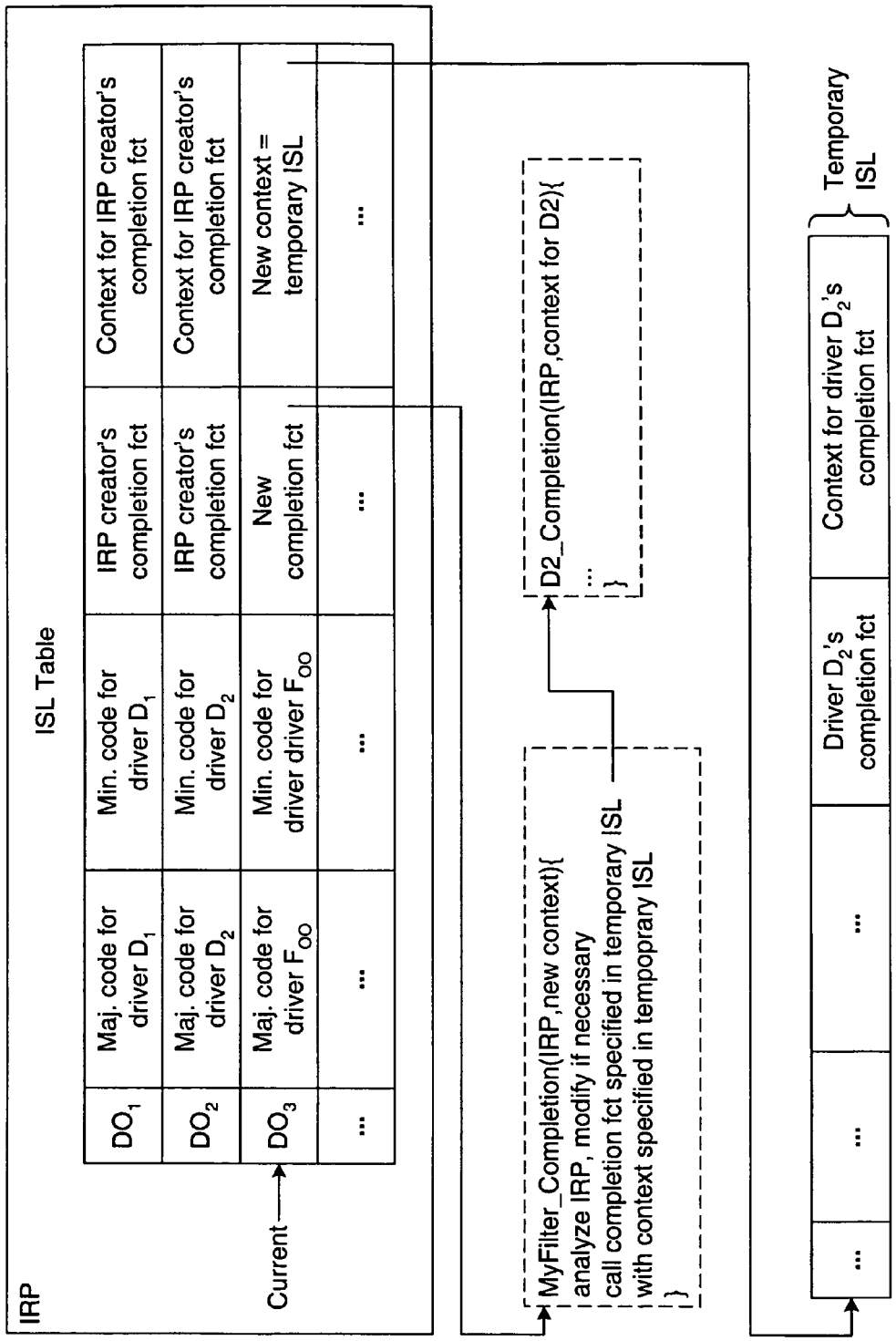
FIG. 16g illustrates an IRP stack location table in the case of completion filtering.

FIGS. 16f and 16g show the ISL table before and after the modification, respectively. When the FOO driver completes an IRP that was marked for completion filtering by MyFilter_PnP( ) during the launch phase, the WDM operating system calls the completion function specified by the ISL and passes it the context argument also specified by the same ISL (in addition to a pointer to the IRP being completed, which is always passed). The function MyFilter_Completion( ) thus gets called with a pointer to the IRP and a pointer to the temporary ISL. MyFilter_Completion( ) performs the following operations:

1. Examine the IRP, and modify it if desired;
2. Retrieve a pointer to the original completion function (belonging to D2) from the temporary ISL;
3. Retrieve the context argument for the original completion function from the temporary ISL;
4. Destroy the temporary ISL since it is no longer needed; and
5. Call the original completion function, passing it a pointer to the IRP and its context argument.

Just as with the launch phase, using the invention, the WDM operating system and all other drivers involved are unaware that the IRP is being filtered during the completion phase.

Agent

The agent is a special program module that provides the dynamic USB driver substitution capability according to the invention. The agent is preferably implemented as a kernel-mode driver (KMD), which is a well-known type of program module supported by all WDM operating systems. A KMD does not need to communicate with any actual hardware device; in its simplest form, it is an arbitrary program that runs with the same privileges as the OS and WDM drivers.

Agent Initialization

The agent is first installed as a component within the operating system, preferably as a driver (in the figures, it is show separate from other drivers for the sake of clarity), and is registered by an installation application, using standard WDM OS services. The agent is then automatically loaded on the next OS reboot.

When the OS loads the agent, it calls its DriverEntry routine to allow the agent to initialize itself. In addition to the well-known initializations that all KMDs must perform, the agent collects the following USB-related information:

1. the host controller's FDO;
2. the driver object for the host controller driver (for example, uhci.sys);
3. the root hub's PDO;
4. the root hub's FDO; and
5. the driver object for the hub driver (usbhub.sys).

The agent locates the host controller's FDO by passing the controller's known device name (in WDM, "\\Dos-Devices\HCD0") to the OS utility function IoGetDeviceObjectPointer( ).

The agent then locates the root hub's PDO. In doing so, it takes advantage of the fact that the root hub PDO and the host controller FDO are both owned by the HC driver. The procedure is:

1. Find the host controller's driver object and all of its device objects using the method outlined in the above paragraph "Internal Structure of Device and Driver Objects."
2. Determine which of the HC driver's device objects is a PDO using the technique outlined in the same paragraph above; that device object must be the root hub's PDO.

The root hub FDO is easily found by following the PDO's AttachedDevice pointers to the top of the device stack.

Finally, the agent locates the USB hub driver's driver object as follows:

1. Find the root hub's FDO by following the AttachedDevice pointers from the root hub's PDO.
2. The DriverObject field of the root hub's FDO points to its owner, which is the hub driver.

Figure 15:
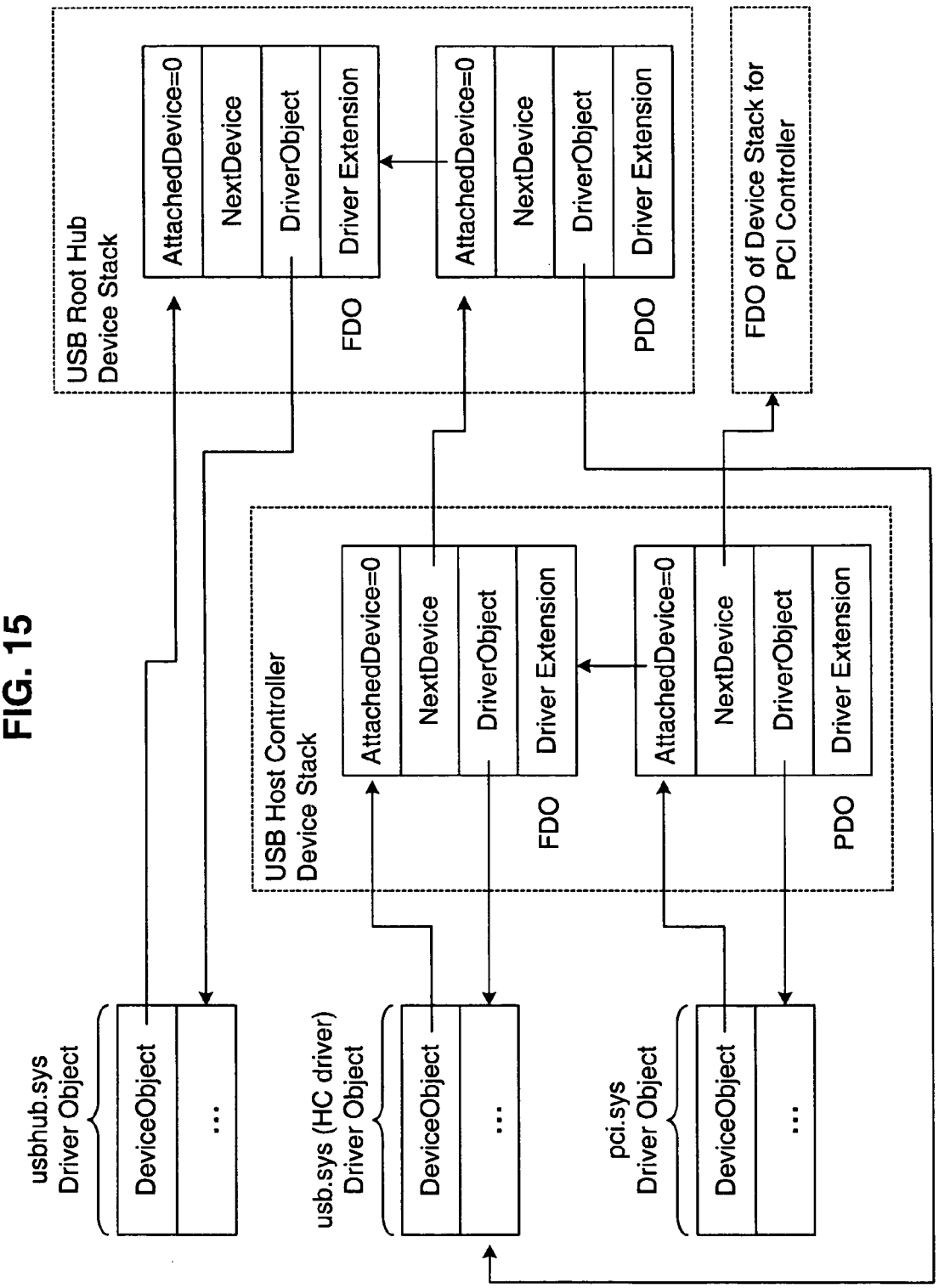
FIG. 15 illustrates the internal structure of USB device and driver objects.

The information and the paths by which it is obtained for initializing the agent are illustrated in FIG. 15.

Target Driver Registration

The agent exposes a public API that allows any application to request driver substitution for a selected USB device. An application that wishes to use the API must first make the following preparations:

1. Identify a new driver for the USB device. Here, by way of example, this driver is named "target.sys."
2. Define a hardware ID, named, for example, targetID, to be associated with target.sys. The targetID may simply be a pair of arbitrary numbers. The application can choose any pair of numbers, as long as they are unique, that is, they don't conflict with the hardware ID of any existing USB devices. The organization "USB Implementors Forum" at present provides a service that allows vendors to register unique vendor IDs. The application vendor can use this service, for example, to obtain a unique vendor ID, which can be used as the basis for a unique targetID.
3. Create a new registry entry mapping targetID to target.sys using well-known OS services. This is typically done by supplying an .INF (information) file to the OS API named SetupCopyOEMInf( ).

Agent Interface

When the agent loads, it registers a unique device object name that allows applications to open a communications channel (called "handle") with it. The name may be arbitrary, as long as it follows the OS's naming convention and does not conflict with names registered by other active drivers.

According to the invention, the agent includes a mechanism by means of which applications may send it requests using the well-known DeviceIoControl( ) OS API. This function allows an application to send a message to a driver; in particular, in this case, it allows an application to send a message to the agent. The format and contents of the message are defined by the driver and must be known by the application. The agent defines a request as a structure with the following information:

1. An operation code (opcode) indicating the desired operation: ACQUIRE or RELEASE.
2. The topology information of the USB device to operate on. This information includes two fields: a) the device name of the hub on which the USB device is attached; and b) the number of the hub port to which the device is attached.
3. The hardwareID of the device on which to perform driver substitution. In this example, this is sourceID, which is associated with the source.sys driver.
4. The hardwareID associated with the new driver to substitute. In this example, this is targetID, associated with the target.sys driver. The hardwareID is used only for an ACQUIRE operation.

An application can determine the sourceID and topology information of any attached USB device using a the well-known USB device enumeration API published by the WDM OS vendor. For example, Microsoft Corporation's Driver Development Kit (DDK) contains header files and a sample program explaining how to use the Windows 2000's USB enumeration API.

In order to send a request to the agent, an application first obtains a handle to the driver by calling CreateFile( ) with the agent's device name. It then constructs an agent request and submits it using the DeviceIoControl( ). The OS packages the request in an IRP with major code IRP_MJ_DEVICE_CONTROL and sends it to the agent.

Finite State Machine Implementation

Figure 17:
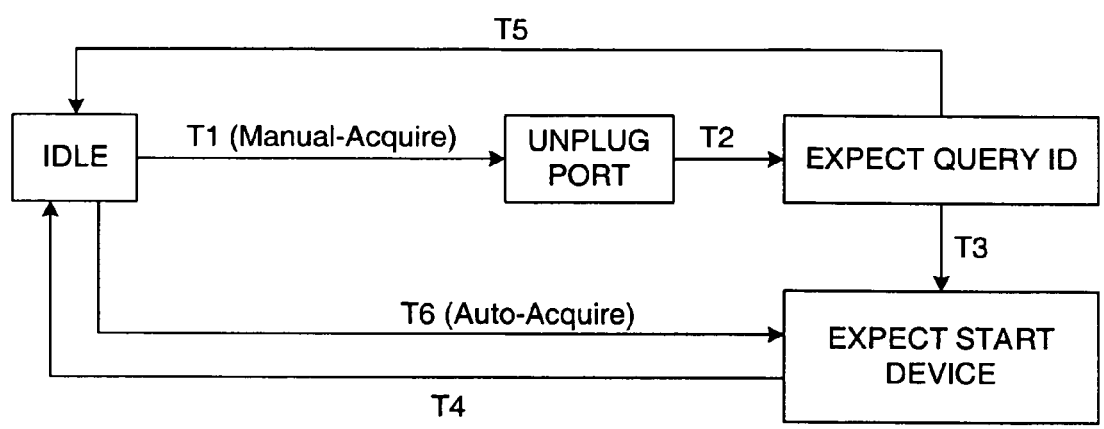
FIG. 17 is a state transition diagram of an agent that implements dynamic driver substitution according to the invention.

In order to coordinate the sequence of events necessary for driver substitution, the preferred embodiment of the agent operates as a finite state machine with the transition diagram shown in FIG. 17. As shown, the agent is in one of the four states at any time and the actions the agent performs depend on the current state. A state transition (labeled T1-T5) occurs when a predefined set of conditions specific to the current state is met. Each transition may cause the agent to perform a set of actions specific to that transition.

IDLE

The agent starts in the IDLE state after it initializes. In this state, the agent waits for a request from any application.

State Transition T1

T1 occurs when an ACQUIRE or RELEASE request is received while the agent is in IDLE. The request becomes the "active request" and the agent makes a copy of it for future reference in other states. The agent then collects information about the parent hub of the USB device identity specified in the request using the following three steps:

1. First, it finds the hub's PDO using the following method:
   a) Get the hub's FDO by calling IoGetDeviceObjectPointer( ) with the parent hub name supplied by the request's topology information.
   b) Check to see if the specified hub is the root hub by comparing the hub's FDO against the root hub FDO obtained during agent initialization. If they match, then proceed to step 2 below, because the specified hub is the root hub, and its PDO is already known from the agent initialization step; otherwise, proceed to sub-step c).
   c) The FDO's DriverObject field points to the hub driver object. Enumerate the list of DOs belonging to the hub driver by starting with the driver object's DeviceObject field and following each DO's NextDevice field. For each DO, determine the top-most DO of its stack by following the DO's AttachedDevice pointer all the way to the top. If the top-most DO is equal to the hub's FDO, then the DO at the origin of the search is the hub's PDO.

2. Determine the hub's UsbdDeviceHandle value. If the hub is the root hub, the UsbdDeviceHandle value is zero. Otherwise, it is read from the driver extension belonging to the hub's PDO (see description of "USB Driver Device Handle" above).

3. Finally, the agent passes the hub's PDO to IoInvalidateDeviceRelations( ) (which any driver can call), causing the OS to think that the hub's set of children may have changed. Note that, normally, the hub driver will be the one calling IoInvalidateDeviceRelations( ) but that, here, the agent is "impersonating" a hub driver and calls the function.

The agent saves the hub's PDO and UsbdDeviceHandle value into temporary variables named, for example, hubPdo and hubUsbdDevHdl, respectively, for future reference. It then enters the state UNPLUG_PORT.

State Transition T6

As is mentioned above, the agent may be put in an auto-acquire mode in which it substitutes the driver for a device that has not yet been connected to the system. When the auto-acquire mode is turned on, the agent transitions directly (transition T6) to a state EXPECT_START_DEVICE, in which it monitors hardware IDs submitted to the OS to detect the ID for the device for which the driver is to be switched. This EXPECT_START_DEVICE state is described below.

UNPLUG_PORT

While in this state, the agent fools the hub driver into thinking that the USB device specified by the active request has been unplugged from its parent hub.

The IoInvalidateDeviceRelations( ) call from transition T1 causes the OS to send an IRP_MN_QUERY_DEVICE_RELATIONS to the parent hub's stack. In response to an IRP_MN_QUERY_DEVICE_RELATIONS, the hub driver always queries the state of the affected hub's ports, regardless of whether a change was detected through the hub's SCE.

As previously described, the hub driver sends a GET_STATUS URB to query the state of a specific port belonging to a particular hub. The URB's UsbdDeviceHandle identifies which hub device to query. The GET_STATUS transaction itself encodes the port number being queried.

While in the UNPLUG_PORT state, the agent observes all URBs launched to the HC driver. If it detects a GET_STATUS URB with a UsbdDeviceHandle value matching hubUsbdDevHdl and a port number matching the port number from the active request's topology information, then the agent marks the URB for completion filtering.

When the HC driver completes the URB, the agent's completion function is invoked, allowing it to examine the URB a second time. The agent modifies the URB's result by clearing the PORT_CONNECTION bit. The agent then continues the URB's completion phase by calling IoCompleteRequest( ) which ultimately causes the hub driver's completion to get invoked.

Upon detecting that the one of its children's port is in the disconnected state, the hub driver concludes that the child must have been unplugged, and removes the child's PDO from its list of children. The hub driver then replies to the IRP_MN_QUERY_DEVICE_RELATIONS IRP with the updated set of PDOs.

Upon noticing that a PDO is missing from the hub's new set of children, the OS initiates the destruction sequence for the child's device stack. This includes sending an Through experimentation using a prototype of the invention, it has been observed that some WDM operating systems have a hub driver that does not tolerate an unplug-and-replug of the same USB port occurring too quickly. Consequently, the agent preferably stays in UNPLUG_PORT for an amount of time (called here the "unplug timeout value") that is deemed safe in that it allows the OS to destroy the unplugged child's stack and the hub driver to stabilize. An unplug timeout value of about one second was empirically determined to work in all cases, although other values may of course be used if they are found to be safe using normal experimental methods. The agent can use a well-known OS mechanism such as a timer, to enforce the timeout.

In this example, in which the device is assumed to be a USB device, the agent simulates disconnection ("unplugging") by causing the OS to issue an IRP_MN_QUERY_DEVICE_RELATIONS call and by observing and altering the "true" reply to the resulting generated GET_STATUS URB that identifies the port to be "unplugged." Interaction between the OS (including non-Windows OSs) and non-USB devices (as just one of many examples, the "Firewire" class of devices) will take place using similar and well-defined protocols and calls that the agent can observe and alter in order to cause the OS to believe that the device has been disconnected.

State Transition T2

T2 occurs when the agent has been in UNPLUG_PORT for an amount of time equal or greater than the unplug timeout value.

In this transition, the agent triggers a sequence of events that fool the hub driver into thinking that a new USB device was plugged into the same hub port that was "unplugged" during the UNPLUG_PORT state. The sequence begins by passing the hubPDO value calculated during T1 to IoInvalidateDeviceRelations( ), which again causes the OS to think that the parent hub has noticed a change in its set of children.

EXPECT_QUERY_ID

Transition T1 causes the OS to send an IRP_MN_QUERY_DEVICE_RELATIONS IRP to the parent hub's stack. This leads the hub driver to query the state of each of the parent hub's ports, again. However, in this state, the agent does not filter URBs sent to the HC driver. Therefore, the hub port that was "unplugged" during the UNPLUG_PORT state appears to be connected again, which leads the hub driver to believe that a new device has been plugged in.

The hub driver initiates the creation of a new stack by first creating a PDO for the new child, then passing it back to the OS as part of the updated set of child PDOs in the reply to the IRP_MN_QUERY_DEVICE_RELATIONS IRP.

The OS notices the new PDO and sends it an IRP_MN_QUERY_ID IRP. The hub driver owns the new PDO, so it receives the IRP. The hub driver responds to this IRP in the usual manner, that is, by sending a URB to read the child's device descriptor, constructing a hardware ID, then sending the ID back to the OS as the reply to IRP_MN_QUERY_ID.

In this state, the agent observes all PnP IRPs launched to the hub driver. Completion filtering is activated for all observed IRPs, allowing the agent to observe every IRP a second time when the IRP is completed by the hub driver.

The agent looks for a completed IRP with the following characteristics:

It is a PnP IRP with minor code IRP_MN_QUERY_ID IRP.

The IRP's result matches the sourceID specified by the active request.

When the agent's completion function is invoked and detects an IRP meeting the above requirements, the agent undergoes a state transition. Which state transition takes place depends on the active request's operation type. If the active request is an ACQUIRE operation, T3 takes place, otherwise, it is T5.

State Transition T3

T3 occurs when the active request is an ACQUIRE operation and the agent detects the first IRP_MN_QUERY_ID IRP completed by the hub with a result matches the request's sourceID.

The agent modifies the IRP's result by replacing sourceID with the targetID specified in the active request. Before finishing the completion phase for the IRP, the agent saves the current ISL's device object pointer field (see description above of the IRP Location Stack) in a variable named childPDO. This variable identifies the PDO of the new stack that is being created for the child device.

The agent then enters the state EXPECT_START_DEVICE.

EXPECT_START_DEVICE

The hardware ID substitution that took place during transition T3 causes the OS to load the driver target.sys instead of source.sys for the new child device.

When in this state, the agent waits for an indication that the FDO for the new child's stack has been created. The most reliable indication of this is an IRP_MN_START_DEVICE IRP sent from the OS to the new device's stack, since this IRP can be sent only after the FDO is created.

To detect this condition, the agent observes all PnP IRPs launched to the hub driver during this state. The condition is satisfied when an IRP_MN_START_DEVICE IRP is sent to a device object matching the childPDO determined in T3.

Before the FDO is created, the OS might send a second IRP_MN_QUERY_ID to the child's PDO. This happens the first time the OS ever sees targetID as a hardware ID. Recall that the OS looks in the registry to find a mapping from a hardware ID to a driver. The first time driver substitution is ever performed, a registry mapping for target.sys, which the OS obtains from the first IRP_MN_QUERY_ID, does not exist. The OS then looks for a driver information (.INF) file specifying a driver to associate with sourceID. This file will have been previously installed by the application requesting driver substitution (see above under "Target Driver Registration"). Once this file is found, the OS creates the registry mapping, and restarts the device detection process a second time. This causes the child's hardware ID to be read again, which leads to a second IRP_MN_QUERY_ID being sent to the new child's PDO.

While in this state, the agent must therefore continue to modify IRP_MN_QUERY_ID IRPs with a result matching sourceID, similar to what it did during EXPECT_QUERY_ID and T3. This guarantees that the OS still sees targetID as the child's hardware ID in case a second IRP_MN_QUERY_ID is sent.

State Transition T4

T4 occurs when the agent is in the state EXPECT_START_DEVICE and detects that the device stack for the USB device has been successfully recreated with target.sys as the FDO's driver. No actions are taken. The agent simply returns to STATE_IDLE, waiting for the next request.

State Transition T5 and the RELEASE Operation

The RELEASE request destroys the stack for a device whose driver was previously substituted, and causes the OS to re-create a new stack with the original source.sys as the FDO driver.

The RELEASE and ACQUIRE operations share the first two active states: UNPLUG_PORT and EXPECT_QUERY_ID. The difference with RELEASE is that once the agent detects an IRP_MN_QUERY_ID whose result matches sourceID, it concludes that the previous stack with an FDO belonging to target.sys has successfully been destroyed, and transitions back to IDLE through T5. No actions are performed in T5.

Not Yet Connected Devices—Auto-Acquire Mode

In the example above, it is assumed that the driver source.sys for a device that is already connected is replaced with another driver target.sys. The main events that the agent according to the invention causes and carries out are:

A. simulate disconnection of the device, and

B. simulate reconnection of the device, during which

C. the device ID is "faked," (a replacement hardware ID is submitted instead of the "true" ID, which D. causes the OS to load the new driver.

The invention may also be used to substitute in a driver for a device that has yet to be connected to the system. In these cases, steps A and B above are not needed. As mentioned earlier, auto-acquisition may be either non-selective or selective. In the non-selective auto-acquire mode, any hardware ID submitted to the OS as part of new device detection is automatically substituted. In the selective auto-acquire mode, the agent substitutes a driver for a newly connected device only if the device has a hardware ID for which the agent is monitoring. When an application tells the agent to enter the auto-acquire mode, it also specifies the option: selective or non-selective. If selective, the application also supplies the hardware ID for the agent to match.

In the auto-acquire mode, when the agent, through monitoring IRPs as described above, detects submission of a new hardware ID (for non-selective acquisition, any hardware ID; for selective acquisition, only the hardware ID that matches the one specified by the controlling application) it intercepts this ID and submits a desired ID instead. This causes the OS to load the substitute driver instead of the "true" driver. This auto-acquire embodiment of the invention may therefore be thought of as implementing "immediate" ID replacement. When in the auto-acquire mode, the agent detects the connection of any (or a specific) new device and then passes on to the OS the "fake" ID instead. In other words, the agent is in either the IDLE state or the EXPECT_START DEVICE; in the state diagram of FIG. 17 the transition from the IDLE state to the EXPECT_START DEVICE is indicated as transition T6.

Device State

Whereas the agent may operate in different modes, each device will be in one of two states with respect to its driver. A device is in a non-substituted when its normal (standard) driver controls it, or in the substituted state when a substitute, alternative driver controls it. Note that once a device is in the substituted state, it is irrelevant whether it got in this state through an ACQUIRE request, or because it was plugged in while the agent was in the auto-acquire mode. The following example illustrates the various device states (S: Substituted; NS: Non-Substituted) and agent modes, as well as ACQUIRE, RELEASE, ENTER AUTO-ACQUIRE-MODE, LEAVE AUTO-ACQUIRE-MODE operations:

Assume that a single device A is connected and is in the non-substituted (NS) state. Assume further that the agent is in manual-acquire mode. This initial situation is thus as follows:
STATE: A=NS agent=ManualAcquire Assume that a new device B is the added; therefore:
STATE: A=NS B=NS agent=ManualAcquire The application then sends an ACQUIRE request for A with A's hardware ID, parent hub, and port number
STATE: A=S B=NS agent=ManualAcquire The application then tells the agent to enter auto-acquire mode. The states of existing devices remain unchanged. Thus:
STATE: A=S B=NS agent=AutoAcquire The application then sends an acquire request for B. This works exactly the same way regardless of whether the agent is in manual-acquire or auto-acquire mode.
STATE: A=S B=S agent=AutoAcquire A new device C is then added to the bus. Since the agent is in auto-acquire, it automatically acquires the device.
STATE: A=S B=S C=S agent=AutoAcquire The application now sends a RELEASE request for B by specifying B's hardware ID, parent hub, and port number:
STATE: A=S B=NS C=S agent=AutoAcquire The application tells the agent to enter manual acquire mode:
STATE: A=S B=NS C=S agent=ManualAcquire A new device D arrives. It is left alone:
STATE: A=S B=NS C=S D=NS agent=ManualAcquire Application Redirection Through Driver Substitution Dynamic driver substitution according to the invention may be used not only to change the interaction between a device and an OS, but also to change the application associated with the device. As just one example, consider a class of devices often known as "personal digital assistants" (PDAs) such as the popular "Palm Pilot." One common feature of these devices is the ability to "synchronize" with an application in a larger computer. Examples of such applications include Microsoft Outlook, CorelCentral, and applications that are proprietary to the makers of PDAs.

For example, a user may want to make sure that the weekly planner (or e-mail folders, or address/contact folders, or financial spreadsheet, etc.) in his desktop computer is updated with entries made earlier in a corresponding data base in the PDA. Synchronization is the process by which the planner application in the larger computer is coordinated with the planner application in the PDA so that a single, current fully updated copy of the planning data is both devices.

When not in use, a PDA is often kept in a "cradle," which serves both as a recharging bay and also as a USB connection to the main computer for the purpose of data transfer. Normally, when the PDA is simply being stored or recharged in the cradle, there is no power in the USB cable, since there is no need for any data transfer. When the user want to synchronize the PDA, he presses a button on the cradle, which causes the cradle to power up the USB connection and initiate the synchronization procedure. When the main computer senses power in the USB cable, the OS assumes that a new device has been connected, and will load the driver that launches the synchronization application.

Assume now that one wants the PDA to synchronize or otherwise communicate with some other application than the "standard" synchronization application. Using the invention, the user, or a supervisory application or module, loads the agent into the main computer's OS. The agent then intercepts the normal PDA hardware ID and driver, and instead submits to the OS a substitute ID, which causes the OS to load a substitute driver that launches or activates a substitute application.

Typically, it will be some application that turns the agent "on" and "off" and requests driver substitution (usually of the driver it itself will use) in the selective auto-acquire mode. A substitute application (such as a synchronization application) could therefore instruct the agent to switch to a substitute driver when the substitute application is in the foreground. When the substitute application comes to the foreground, it tells the agent to enter auto-acquire mode for any new device matching the desired PDA's hardware ID. When another window becomes the foreground window, however, the substitute application tells the agent to turn off auto-acquisition. Note that in this use case the substitute application never needs to send explicit ACQUIRE or RELEASE requests to the agent: a PDA is automatically acquired when it connects while the substitute application is in the foreground. A RELEASE is not needed because once the PDA finishes synchronizing with the application, it automatically powers itself off, effectively disconnecting from the system.

Recall that when the agent is in the auto-acquire mode, it can still substitute the driver for an already connected device by acting on ACQUIRE requests issued to it by an application. Turning off auto-acquisition is therefore equivalent to setting the agent in manual-acquire mode, since, in this state, the agent will not act unless it receives an ACQUIRE or RELEASE request. Setting the agent in manual-acquire mode and never issuing any requests is therefore equivalent to turning the agent off.

ADVANTAGES OF THE INVENTION

The invention has several advantages over the prior art. These include (but are of course not limited to) the following:

1. Drivers can be substituted dynamically, without needing to power off the system as a whole or reboot the OS;

2. Substitution of a driver for one device of a type (for example, for one of a group of hard disks or Zip drives) does not disturb or otherwise affect other devices of the same type;
3. Driver substitution may be done even for devices that are required to boot the OS;
4. The "standard" driver can be reinstated just as easily as it was replaced. Driver substitution may thus be done on a temporary basis. In other words, the invention allows for substantially unlimited switching between a standard driver and one or more substitute drivers, again with no need to reboot the OS or physically power off any hardware. Similarly, the operation of driver substitution may be turned on and off at will.
5. The driver substitution mechanism according to the invention may be implemented entirely in software, with no need for hardware modifications, and no need to customize the devices. Even the operation of turning the substitution mechanism on and off can be done wholly in software. Neither the host computer system (including the OS) nor the devices themselves are even "aware" of the presence and operation of the agent and other mechanisms used by the invention—drivers may be substituted with no need for the OS or devices to alter the behavior they would have had no driver substitution taken place.
6. Drivers may be substituted both for devices that are already connected (or powered on) and have drivers in place and for devices that are not yet so connected.

General System Implementation of the Invention

FIG. 18 illustrates the configuration of a general computer system that includes the invention. System hardware 1801 includes one or more central processors CPU(s) 1802, which may be a single processor, or two or more cooperating processors in a known multiprocessor arrangement. As in most computers, two different types of data storage are commonly provided: system memory 1804, typically implemented using any of the various RAM technologies, and a usually higher-capacity storage device 1806 such as one or more disks. The system hardware will typically also include, or be connected to, conventional registers, interrupt-handling circuitry, a memory management unit, etc.

System software 1820 either is or at least includes an operating system OS 1830, which will include drivers 1840 as needed for controlling and communicating with various devices, including, usually the disk 1806. Applications 1860 are installed to run on the hardware 1800 via the system software 1830. In FIG. 18, a driver 1842 is shown as being the "standard" or existing driver (Source.sys) for two devices 1810, 1811.

The agent 1850 is loaded as a software module within the OS 1830. As is explained above, the agent 1850 is preferably loaded as a driver. It is shown being separate from the drivers 1840 in FIG. 18 merely for the sake of clarity. The OS 1830 also includes the various DO stacks 1855 described above; these DO stacks are normally data structures stored within the memory 1804, but are shown within the OS 1830 because it is the OS that creates and controls the DO stacks. At least one substitute driver 1844 (Target.sys) is provided and made available for loading into and by the OS.

As is described above, the agent 1850 preferably includes the filter mechanism 1852, which inspects and processes IRPs launched to a particular driver (here, the source driver 1842); the filter mechanism may instead be included as a separately loaded software module as long as it communicates with the agent.

In FIG. 18, the agent is shown as including a driver decision "switch" 1854 to indicate the agent's function of choosing which driver—Source or Target—to cause the OS to load and control the device 1810. Note that it would also be possible to provide more than one alternative, substitute driver, as long as the user or application that requests driver substitution is aware of the alternatives and the agent is instructed which driver to substitute. The agent's switching function may thus be "multi-way," that is, between source.sys and more than one target driver, for example, target1.sys, target2.sys, etc.

FIG. 18 also illustrates how the driver may be switched for fewer than all devices of a type: The driver has been switched to Target for device 1810, but remains Source for device 1811.

Virtualized System Implementation

Figure 19:
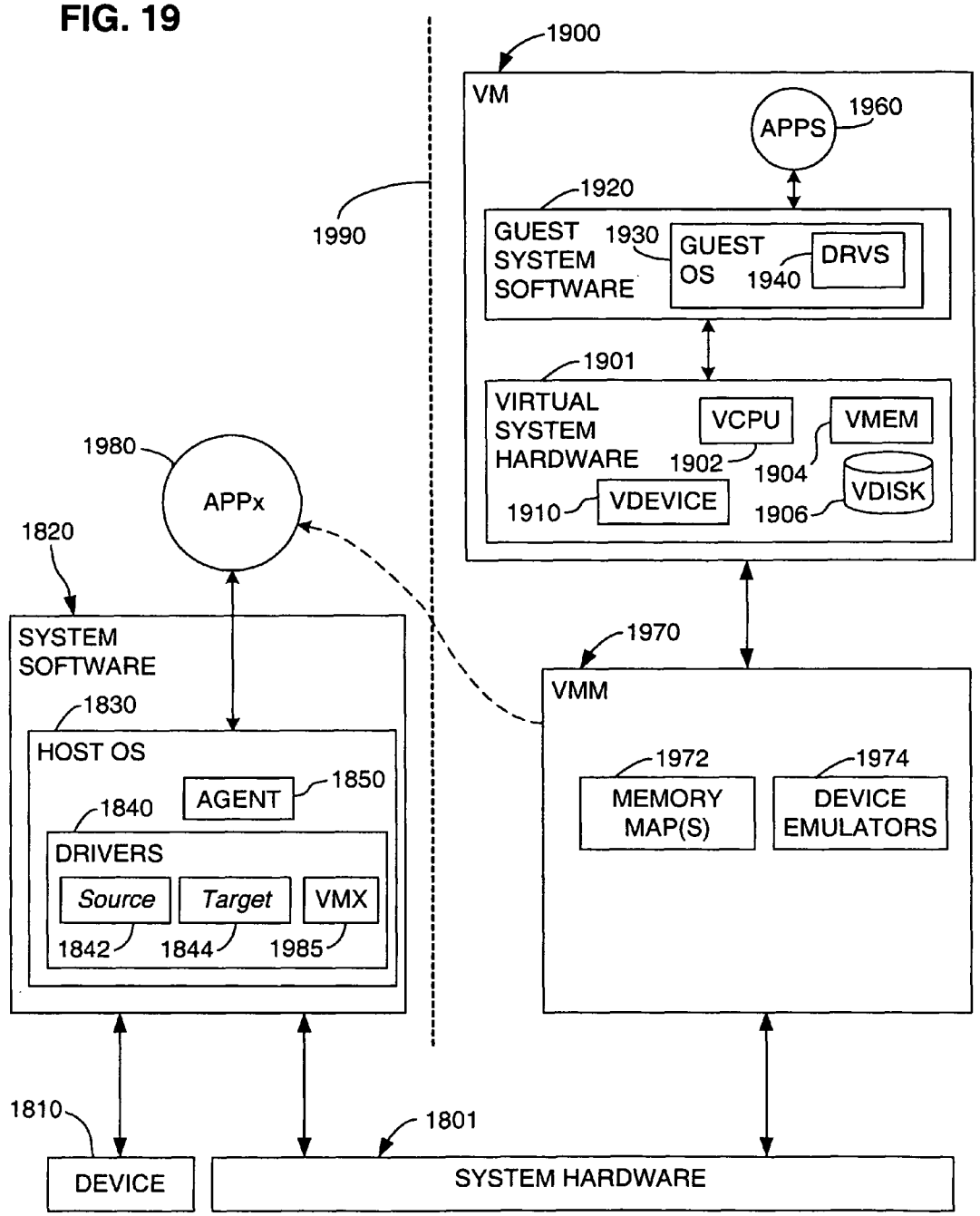
FIG. 19 shows the system configuration of a computer that includes the invention and at least one virtual machine running on the computer.

FIG. 19 illustrates the main components of an embodiment of the invention in which the system hardware 1801 and system software 1820 comprise a host on which a guest virtual machine (VM) 1900 is installed. Reference numerals in FIG. 19 that are the same as those in FIG. 18 refer to the same components and features.

As is well known in the art, a VM is a software abstraction—a "virtualization"—of an actual physical computer system. As such, each VM will typically include virtualized ("guest") system hardware 1901 and guest system software 1920, which are software analogs of the physical hardware and software layers 1801, 1820. Note that although the virtualized hardware "layer" 1901 will be a software abstraction of physical components, the VM's system software 1920 may be the same as would be loaded into a "real" computer. The modifier "guest" is used here to indicate that the various VM software components, from the perspective of a user, are independent, but that actual execution is carried out on the underlying "host" hardware and software platform 1801, 1820. The guest system hardware 1901 includes one or more virtual CPUs 1902 (VCPU), virtual system memory 1904 (VMEM), a virtual disk 1906 (VDISK), and at least one virtual device 1910 (VDEVICE), all of which are implemented in software to emulate the corresponding components of an actual computer.

The guest system software 1920 includes a guest operating system 1930, which may, but need not, simply be a copy of a conventional, commodity OS, as well as drivers 1940 (DRVS) as needed, for example, to control the virtual device 1910.

Of course, most computers are intended to run various applications, and a VM is usually no exception. Consequently, by way of example, FIG. 19 illustrates one or more applications 1960 installed to run on the guest OS 1930; any number of applications, including none at all, may be loaded for running on the guest OS, limited only by the requirements of the VM.

If the VM is properly designed, then the applications (or the user of the applications) will not "know" that they are not running directly on "real" hardware. Of course, all of the applications and the components of the VM are instructions and data stored in memory, just as any other software. The concept, design and operation of virtual machines are well known in the field of computer science. FIG. 19 illustrates a single VM 500 merely for the sake of simplicity—in many installations, there will be more than one VM installed to run on the common hardware platform; all will have essentially the same general structure, although the individual components need not be identical.

Some interface is usually required between the VM 1900 and the underlying host hardware 1801, which is responsible for actually executing VM-related instructions and transferring data to and from the actual, physical memory. One advantageous interface between the VM and the underlying host system is often referred to as a virtual machine monitor (VMM) 1970. A VMM is usually a relatively thin layer of software that runs directly on top of a host, such as the system software 1820, or directly on the hardware, and virtualizes the resources of the (or some) hardware platform.

The VMM will typically include at least one device emulator 1974, which may also form the implementation of the virtual device 1910, as well as one or more memory maps 1972. The interface exported to the respective VM is usually such that the guest OS 1930 cannot determine the presence of the VMM. The VMM also usually tracks and either forwards (to the host OS 1830) or itself schedules and handles all requests by its VM for machine resources as well as various faults and interrupts. The general features of VMMs are known in the art and are therefore not discussed in further detail here.

In FIG. 19, a single VMM 1970 is shown acting as the interface for the single VM 1900. It would also be possible to include the VMM as part of its respective VM, that is, in each virtual system. Although the VMM is usually completely transparent to the VM, the VM and VMM may be viewed as a single module that virtualizes a computer system. The VM and VMM are shown as separate software entities in the figures for the sake of clarity. Moreover, it would also be possible to use a single VMM to act as the interface for more than one VM, although it will in many cases be more difficult to switch between the different contexts of the various VMs (for example, if different VMs use different guest operating systems) than it is simply to include a separate VMM for each VM. This invention described below works with all such VM/VMM configurations.

In some configurations, the VMM 1970 runs as a software layer between the host system software 1820 and the VM 1900. In other configurations, such as the one illustrated in FIG. 19, the VMM runs directly on the hardware platform 1801 at the same system level as the host OS. In such case, the VMM may use the host OS to perform certain functions, including I/O, by calling (usually through a host API—application program interface) the host drivers 1840. In this situation, it is still possible to view the VMM as an additional software layer inserted between the hardware 1801 and the guest OS 1930. Furthermore, it may in some cases be beneficial to deploy VMMs on top of a thin software layer, a "kernel," constructed specifically for this purpose.

In yet other implementations, the kernel takes the place of and performs the conventional functions of the host OS. Compared with a system in which VMMs run directly on the hardware platform, use of a kernel offers greater modularity and facilitates provision of services that extend across multiple virtual machines (for example, resource management). Compared with the hosted deployment, a kernel may offer greater performance because it can be co-developed with the VMM and be optimized for the characteristics of a workload consisting of VMMs.

As used herein, the "host" OS therefore means either the native OS 1830 of the underlying physical computer, or whatever system-level software handles actual I/O operations, loads drivers, takes faults and interrupts, etc. The invention may be used in all the different configurations described above.

VMware, Inc. of Palo Alto, Calif. offers products that implement a configuration as shown in FIG. 19, in which I/O requests issued by the VM are intercepted by the VMM, but are carried out by the host OS 1820. To accomplish this, a special driver VMX 1985 is loaded in the host OS 1830 as any other, and a special application APPx 1980 is also installed on the host OS. When the VMM needs the host OS to process an I/O request, it calls the application APPx 1980, which in turn calls the driver VMX 1985, possibly through an API if needed. The driver VMX 1985 thus forms a kind of "gateway" into the host OS 1830, through which the VMM can enter via the application APPx 1980. The host OS remains unaware of, and need not be modified to accommodate, the VM/VMM sub-system. The software components of the computer are therefore functionally separated into a "virtual" side and a "non-virtual" side, as illustrated by the line 1990.

In this "virtualized" embodiment of the invention, the VM "believes" it is accessing the virtual device 1910, but the VMM directs the actual access request, via the host OS 1830, to the corresponding physical device 1810. Application APPx 1980 then acts as the application 1860 (FIG. 18) in that it issues IRPs that the agent 1850 detects and analyzes. As before, the agent may then switch between the Source driver 1842 and the Target driver 1844 for the device 1810. The invention thus makes it possible to load a driver 1844 for the device 1810 that implements some special need of the VM/VMM, without having to permanently replace the "normal" driver 1842, which may be needed by other applications running on the host OS. Without the invention, the configuration shown in FIG. 19, as found in products of VMware, Inc., allows the presence of the VM/VMM to be kept transparent to the host OS and any other software components on the "non-virtualized" side of the system, with the host OS still handling I/O requests originating in the VM. Using the invention, this transparency can be taken one step further: The VM/VMM sub-system can use a dedicated, even "customized" driver for a particular device, with no need to modify the host OS or change the driver used by any other sub-system or application.

What is claimed is:

1. A computer program embodied in a tangible medium, the computer program controlling access to a device in a computer system, which includes an operating system (OS) and in which access to the device takes place through a current driver, the computer program performing the following steps:
    while the computer system is continuously powered on, the OS is continuously operational, and while maintaining a physical electrical connection state of the device, by executing a module of computer-executable code that is loaded in the computer system and is external to the device:
        intercepting a request by the OS for a source identifier that is associated with the device and a source driver, which is initially the current driver; and
        dynamically causing a change of the current driver from the source driver to a substitute driver for the device by responding to the request by the OS by returning to the OS a substitute identifier that is different from the source identifier and is associated with the substitute driver, whereby the OS is caused to associate the substitute driver with the device.

2. A computer program as in claim 1, in which:
    the device is already connected to the computer system; and
    the step of dynamically changing the current driver for the device includes causing the OS to rescan the connection status of the device by:
    simulating disconnection of the device; and
    simulating reconnection of the device.

3. A computer program as in claim 2, in which:
    the OS maintains a map of device identifiers to respective corresponding drivers;

upon detection or notification of connection of an added device, the OS requests the identifier for the added device and associates with the added device the driver corresponding to the identifier for the added device, said driver thus becoming the current driver for the added device;

upon detection or notification of disconnection of any connected device, the OS disassociates the current driver from the disconnected device;

the step of simulating disconnection of the device comprises maintaining logical connection of the device to the computer system while notifying the OS of disconnection of the device; and the step of simulating reconnection of the device includes both the step of notifying the OS of connection of the device as if it were an added device and also the step of passing to the OS the substitute identifier.

4. A computer program as in claim 3, in which the step of simulating reconnection of the device further includes the following sub-steps:

monitoring responses to the OS request for the identifier for the added device; and intercepting the response that contains the first identifier and substituting for that response a response that contains the substitute identifier.

5. A computer program as in claim 3, in which:

A) the device is a current device in a group of devices;
B) each device is connected to a respective port;
C) in response to a scan request, a parent sub-system of the group scans the ports to determine the connection status of the respective device and returns connection status information indicating the connection status of each device in the group;
D) the OS maintains a list of connected devices and detects device disconnection by comparing the list with the connection status information returned by the parent sub-system;
E) the step of simulating disconnection of the device includes the following sub-steps:
  i) causing the OS to issue a scan request to the parent sub-system;
  ii) monitoring the parent sub-system for its response to the scan request and, for the device whose driver is to be substituted, changing, in the returned connection status information, the corresponding connection status to indicate disconnection; and
F) the step of simulating reconnection of the device includes the following sub-steps:
  i) causing the OS to issue another scan request to the parent sub-system;
  ii) monitoring the parent sub-system for its response to the scan request and allowing the returned connection status information to pass the OS unchanged.

6. A computer program as in claim 3, wherein the computer program further performs a step of installing an agent within the OS, the agent performing the steps of simulating disconnection and reconnection of the device.

7. A computer program as in claim 3, in which:

the device is a current device in a group of devices sharing a common identifier and therefore default driver; and the steps of simulating disconnection and reconnection and of dynamically changing the current driver are carried out only for the current device, the remaining devices in the group continuing to share the common driver.

8. A computer program as in claim 3, in which the device is a physical device, the computer program further performing the following steps:

installing within the computer system a virtual machine (VM), which includes a virtual device;

installing within the computer system a virtual machine monitor (VMM) as an interface between the VM and a hardware platform of the computer system;

converting, in the VMM, access requests issued from within the VM to the virtual device into access requests for the physical device;

passing the access requests for the physical device to the OS; and dynamically changing the driver for the physical device.

9. A computer program as in claim 8, in which:

the devices in the group, including the current device, communicate with the computer system using the Universal Serial Bus (USB) protocol; and the parent sub-system is a USB hub driver.

10. A computer program as in claim 1, wherein the computer program further performs a step of installing an agent within the OS, the agent performing the step of passing the substitute identifier to the OS.

11. A computer program as in claim 10, wherein the agent is installed as a driver within the OS.

12. A computer program as in claim 10, in which the agent performs the step of passing the substitute identifier to the OS only after a requesting program issues a request for driver substitution to the agent.

13. A computer program as in claim 1, in which the current and substitute drivers control access to the device by a current and a substitute application, respectively, the substitution of the substitute driver for the current driver thus also changing which of the applications has access to the device.

14. A computer program as in claim 1, wherein the computer program further performs a step of dynamically changing the current driver for the device before the device is logically connected to and accessible on the computer system.

15. A computer program as in claim 14, in which:

the OS maintains a map of device identifiers to corresponding drivers;

upon notification of connection of an added device, the OS requests the identifier of the added device and associates with the added device the driver corresponding to the identifier, said driver becoming the current driver for the added device;

upon connection of the device to a port, whose status is monitored by a parent sub-system, the parent sub-system notifies the OS that the device has been added;

the computer program further performing the following steps:

detecting the OS request for the identifier of the added device; and intercepting the response by the parent sub-system to the OS request that includes the first identifier and instead passing the substitute identifier to the OS, the OS then loading the substitute driver as the current driver.

16. A computer program embodied in a tangible medium, the computer program controlling access to a device that is connected to a computer system in which:

A) the computer includes an operating system (OS);
B) access to the device takes place through a current driver;
C) the device is identified by a first identifier, which the OS associates with the current driver for the device;
D) the OS maintains a map of device identifiers to respective corresponding drivers;
E) upon detection or notification of connection of an added device, the OS requests the identifier for the added device and associates with it the driver corresponding to the identifier for the added device, said driver thus becoming the current driver for the added device;

F) upon detection or notification of disconnection of any connected device, the OS disassociates the current driver from the disconnected device;

G) a portion of the computer program being installed as an agent within the OS, the agent, by performing the following steps, dynamically changing the current driver for the device while the computer system is continuously powered on, the OS is continuously operational, and while maintaining a physical electrical connection state of the device:

i) simulating disconnection of the device by notifying the OS of disconnection while maintaining logical connection of the device to the computer system;

ii) simulating reconnection of the device, which step comprises:

a) notifying the OS of connection of the device as if it were an added device;

b) monitoring responses to the OS request for the identifier for the device;

c) intercepting the response that contains the first identifier and substituting for that response a response that contains a substitute identifier, which is associated with a substitute driver; and d) passing the substitute identifier to the OS, the OS thereby causing the OS to assign the substitute driver as the current driver for the device.

17. A computer program as in claim 16, in which the device is a physical device, the computer program further performing the following steps:

installing within the computer system a virtual machine (VM), which includes a virtual device;

installing within the computer system a virtual machine monitor (VMM) as an interface between the VM and a hardware platform of the computer system;

converting, in the VMM, access requests issued from within the VM to the virtual device into access requests for the physical device;

passing the access requests for the physical device to the OS; and dynamically changing the driver for the physical device.

* * * * *